(12) United States Patent
Ochsenbein et al.

(10) Patent No.: US 12,448,458 B2
(45) Date of Patent: Oct. 21, 2025

(54) LIGANDS TO LIGHT OR ITS RECEPTOR LTβR FOR USE IN HAEMATOLOGIC MALIGNANCIES

(71) Applicant: UNIVERSITÄT BERN, Bern (CH)

(72) Inventors: Adrian Ochsenbein, Hinterkappelen (CH); Sabine Höpner, Bern (CH); Carsten Riether, Bern (CH)

(73) Assignee: UNIVERSITÄT BERN, Bern (CH)

( * ) Notice: Subject to any disclaimer, the term of this patent is extended or adjusted under 35 U.S.C. 154(b) by 1022 days.

(21) Appl. No.: 17/252,329

(22) PCT Filed: Jun. 14, 2019

(86) PCT No.: PCT/EP2019/065780
§ 371 (c)(1),
(2) Date: Dec. 15, 2020

(87) PCT Pub. No.: WO2019/238966
PCT Pub. Date: Dec. 19, 2019

(65) Prior Publication Data
US 2021/0253723 A1  Aug. 19, 2021

(30) Foreign Application Priority Data
Jun. 15, 2018 (EP) .................... 18178050

(51) Int. Cl.
*C07K 16/28* (2006.01)
*A61P 35/02* (2006.01)
*C12N 15/86* (2006.01)

(52) U.S. Cl.
CPC .......... *C07K 16/2875* (2013.01); *A61P 35/02* (2018.01); *C12N 15/86* (2013.01)

(58) Field of Classification Search
None
See application file for complete search history.

(56) References Cited

U.S. PATENT DOCUMENTS

| | | | | |
|---|---|---|---|---|
| 5,925,351 A * | 7/1999 | Browning | ............... | A61P 31/08 514/19.3 |
| 6,403,087 B1 * | 6/2002 | Browning | ................. | A61P 1/00 514/6.9 |
| 6,669,941 B1 * | 12/2003 | Browning | ............... | A61P 21/00 514/6.9 |
| 7,060,667 B1 * | 6/2006 | Browning | ............... | A61P 37/04 512/2 |
| 2005/0037003 A1 * | 2/2005 | Browning | .......... | C07K 14/7151 424/144.1 |
| 2006/0134102 A1 | 6/2006 | Lepage et al. | | |
| 2011/0171242 A1 | 7/2011 | Ware | | |
| 2013/0216557 A1 * | 8/2013 | Bienkowska | ........ | C12Q 1/6883 435/7.1 |

FOREIGN PATENT DOCUMENTS

| | | | |
|---|---|---|---|
| EP | 0954333 | 11/1999 | |
| EP | 2157981 | 3/2010 | |
| WO | 9817313 | 4/1998 | |
| WO | 9902563 | 1/1999 | |
| WO | 2004031409 | 4/2004 | |
| WO | WO-2004031409 A2 * | 4/2004 | ......... A61K 39/0011 |
| WO | 2010046289 | 4/2010 | |

OTHER PUBLICATIONS

Open Resources for Nursing (Open RN); Ernstmeyer K, Christman E, editors. Nursing Skills [Internet]. EauClaire (WI): Chippewa Valley Technical College; 2021. (Year: 2021).*
Michaelson et al. Anti-tumor activity of stability-engineered IgG-like bispecific antibodies targeting TRAIL-R2 and LTbetaR. MAbs. Mar.-Apr. 2009; 1(2):128-41. doi: 10.4161/mabs.1.2.7631. Epub Mar. 11, 2009. PMID: 20061822; PMCID: PMC2725416. (Year: 2009).*
Vanarsdale et al. Lymphotoxin-b receptor signaling complex: role of tumor necrosis factor receptor-associated factor 3 recruitment in cell death and activation of nuclear factor kB Proc. Natl. Acad. Sci. 1997. 94:2460-2465 (Year: 1997).*
Mccarthy et al. The lymphotoxin pathway . . . Immunological Research. 2006. 35/1-2:41-53 (Year: 2006).*
Christian. Nonconventional and Vernacular Construction Materials. Ch. 5.2.3. 2016. Retreived Oct. 26, 2023 online from Science Direct at <URL: https://www.sciencedirect.com/topics/chemistry/biopolymer#:~:text=Biopolymers%20are%20polymers%20that%20are,sources%20of%20biopolymers%20are%20renewable.> (Year: 2016).*
Anand et al. Essential role of TNF family molecule Light as a cytokine in the pathogenesis of hepatitis. J Clin Invest. 2006. 116(4): 1045-1051. (Year: 2006).*
Fernandes et al. Brit J Haematol. 2015. 171:736-751. (Year: 2015).*
American Society of Hematology. Blood Cancers. Retrieved Jan. 29, 2025 from <URL: https://www.hematology.org/education/patients/blood-cancers> (Year: 2025).*
Harris. Mod Pathol. 2000. 13(2):193-207 (Year: 2000).*
Taylor. Blood. 2017. 130(4): 410-423 (Year: 2017).*
Brunetti. Oncotarget. 2014. 5(24):12950-12967 (Year: 2014).*
Rizzi. 23rd Congress of the European Hematology Association: PB2121. 2018. 2(S1):950-951 (Year: 2018).*
Schmidt. Blood. 2016.128(8):1101-111 (Year: 2016).*
Fernandes. Biochimica et Biophysica Acta. 2016. 1865:204-219 (Year: 2016).*
Lannetti et al. PLoS Genetics. 2014. 10(9) (Year: 2014).*
Hsieh et al. Blood. 2014. 123(15):2401-2411 (Year: 2014).*

(Continued)

*Primary Examiner* — Anne M. Gussow
*Assistant Examiner* — Brianna K Swartwout
(74) *Attorney, Agent, or Firm* — JMB Davis Ben-David

(57) ABSTRACT

The present invention relates to a non-agonist ligand, particularly an antibody, that specifically binds to LIGHT or its receptor LTβR thereby interrupting the interaction of LIGHT with LTβR for use in treatment of a haematologic malignancy.

7 Claims, 30 Drawing Sheets

(56) References Cited

OTHER PUBLICATIONS

Gasparini. Cell Mol Life Sci. 2014. 71:2083-2102 (Year: 2014).*
Li. Eur Rev Med Pharmacol Sci. 2015. 19: 1829-1836. (Year: 2015).*
Ibraheem et al. Int J Pharma. 2014. 459:70-83 (Year: 2014).*
Hopner et al. Respiration. 2013. 85:523-623. Abstract P177 (Year: 2013).*
Zhai Y et al, "Light, a Novel Ligand for Lymphotoxin Beta Receptor and TR2/HVEM Induces Apoptosis and Suppresses in Vivo Tumor Formation via Gene Transfer", Journal of Clinical Investigation,,vol. 102, No. 6, Sep. 1, 1998 (Sep. 1, 1998), p. 1142-1151.

* cited by examiner f a j 4th recipient: Ly5.1/Ly5.2

4th recipient: Ly5.1/*Light*−/−

LIGANDS TO LIGHT OR ITS RECEPTOR LTβR FOR USE IN HAEMATOLOGIC MALIGNANCIES

CROSS-REFERENCE TO RELATED APPLICATIONS

This is the U.S. National Stage of International Patent Application No. PCT/EP2019/065780 filed on Jun. 14, 2019, which in turn claims the benefit of European Patent Application No. 18178050.3 filed on Jun. 15, 2018.

The present invention relates to a non-agonist ligand, particularly an antibody, that specifically binds to LIGHT or its receptor LTβR for use in treatment of a haematologic malignancy. Particular indications for which the invention is useful include forms of leukemia, lymphoma, myeloma, myeloproliferative diseae, myelodysplastic syndrome and more particularly, myeloid leukemia.

DESCRIPTION

Background

Hematopoietic stem cells (HSCs) comprise a small heterogeneous and hierarchically organized population within lineage negative (Lin⁻), sca-1⁺, c-kit⁺ (LSK) cells. The hierarchy of HSCs is characterized by the progressive decrease of self-renewal capability from long-term (LT-) HSCs over short-term (ST-)HSCs to multipotent progenitors (MPPs). Primitive HSCs undergo very few cell divisions in the life-span of an organism. However, HSCs are able to adapt rapidly to increased demands triggered through infections, inflammation, chemotherapeutic agents or ionizing radiation with increased cell cycling and the production of hematopoietic progenitors. Transcription factors (SatB1, PU-1), cell cycle regulators (Cdkn1a, Gfi-1) or transcriptional regulators (Msi2) regulate the activation of HSCs. In addition, external cues from BM niche cells and immune cells regulate HSC activity. Niche cells maintain HSC quiescence through cell-cell contact via N-cadherin and angiopoietin-1 (Ang1) or via secretion of stem cell factor (SCF) and thrombopoietin (TPO). CXCL12 promotes the retention of HSCs in the BM and contributes to quiescence. HSCs are directly activated by immune effector cytokines such as IFN-α, IFN-γ and TNF-α that contribute to the increased hematopoiesis during inflammation (Schuettpelz, L. G. Link, D. C. et al. Frontiers in immunology (4), 2013). Moreover, HSCs express Toll-like receptors that directly sense conserved microbial products derived from exogenous pathogens and that induce the demand-adapted response to infections.

To ensure life-long production of all hematopoietic lineages, not only the cell division of HSC but also the cell division fate, e.g. differentiation, have to be tightly controlled. Asymmetric cell division, leading to a differentiated and a self-replicable daughter cell assures a constant stem cell pool and a progressive increase of differentiated cells. Symmetric division leads to two identical daughter cells, facilitating the expansion of the stem cell pool or of lineage committed cells.

Leukemic stem cells (LSCs) are responsible for leukemia initiation and propagation. They share several characteristics with HSCs, including quiescence, self-renewal and the capacity to undergo symmetric and asymmetric cell division. Importantly, most of the molecular pathways regulating HSCs also control LSCs. Main signaling pathways mediating maintenance/quiescence in LSCs are CXCL12/CXCR4, Ang-1/Tie2, TPO/MPL, the Notch signaling and the Wnt signaling pathway. The inventors showed that the tumor necrosis factor (TNF) receptor family member CD27 regulates self-renewal and differentiation of HSCs and LSCs.

LTβR, another member of the TNF receptor family is expressed on epithelial, stromal and myeloid cells but not on lymphocytes. Lymphotoxins are cytokines that guide the interaction of immune cells, mainly lymphocytes, with the surrounding stromal cells. LTα and LTβ as heterotrimers (LTα1β2, LTα2β1) and LIGHT are known ligands for LTβR. LTβR signaling is crucially involved in the development and organization of lymphoid tissue. Therefore, secondary lymphoid tissue is absent in mice deficient in Lta, Ltb, or Ltbr but interestingly not in Light-deficient mice. Ligation of LTβR leads to TNF receptor-associated factor 2 (TRAF2)-NIK mediated activation of the classical and alternative NFκB pathway and the transcription of genes involved in inflammation and development. Disruption of LTβR signaling results in impaired protection to viral and bacterial infections. In addition, cancer cells may express LTβR and agonistic antibodies to LTβR trigger cancer cell death and suppress tumor growth in vivo. Based on the above-mentioned state of the art, the objective of the present invention is to provide means and methods to suppress tumor growth in myeloid leukemia. This objective is attained by the subject-matter of the independent claims of the present specification.

Terms and Definitions

The term LTβR in the context of the present specification is used as an acronym for lymphotoxin-beta receptor (Uniprot P36941), and is also known as TNFRSF3 or CD18.

The term LIGHT in the context of the present specification is used as an acronym for TNFSF14 or HVEM-L or CD258; its Uniprot entry is UniProtKB-O43557 (TNF14_HUMAN) and is sometimes referred to as p30 in older literature.

The term HSC in the context of the present specification is used as an abbreviation for hematopoietic stem cell.

The term LSC in the context of the present specification is used as an abbreviation for leukemia stem cell.

The term CLL in the context of the present specification relates to acute chronic lymphocytic or lymphoblastic leukaemia.

The term ALL in the context of the present specification relates to acute lymphoblastic leukaemia.

The term CML in the context of the present specification relates to chronic myelogenous or myeloid leukaemia.

The term AML in the context of the present specification relates to acute myelogenous leukaemia.

The term AMoL in the context of the present specification relates to acute monocytic leukaemia.

The term non-agonist ligand, or non-agonist antibody, when used in the context of the present specification, refers to a ligand or antibody that is capable of tightly and specifically binding to the indicated target, namely LIGHT or LTβR, without eliciting any of the downstream biological effects of binding of a physiological ligand, namely the ligand pair LIGHT and LTβR.

In the context of the present specification, the term antibody refers to whole antibodies including but not limited to immunoglobulin type G (IgG), type A (IgA), type D (IgD), type E (IgE) or type M (IgM), any antigen binding fragment or single chains thereof and related or derived constructs. A whole antibody is a glycoprotein comprising at least two heavy (H) chains and two light (L) chains interconnected by disulfide bonds. Each heavy chain is comprised of a heavy chain variable region (VH) and a heavy chain constant region ($C_H$). The heavy chain constant region is comprised of three domains, $C_H1$, $C_H2$ and $C_H3$. Each light chain is comprised of a light chain variable region (abbreviated herein as $V_L$) and a light chain constant region ($C_L$). The light chain constant region is comprised of one domain, $C_L$. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component of the classical complement system. Similarly, the term encompasses a so-called nanobody or single domain antibody, an antibody fragment consisting of a single monomeric variable antibody domain.

The term antibody encompasses a camelid antibody, particularly a humanized camelid antibody.

The term antibody-like molecule in the context of the present specification refers to a molecule capable of specific binding to another molecule or target with high affinity/a Kd≤10E-8 mol/l. An antibody-like molecule binds to its target similarly to the specific binding of an antibody. The term antibody-like molecule encompasses a repeat protein, such as a designed ankyrin repeat protein (Molecular Partners, Zürich), an engineered antibody mimetic protein exhibiting highly specific and high-affinity target protein binding (see US2012142611, US2016250341, US2016075767 and US2015368302, all of which are incorporated herein by reference). The term antibody-like molecule further encompasses, but is not limited to, a polypeptide derived from armadillo repeat proteins, a polypeptide derived from leucine-rich repeat proteins and a polypeptide derived from tetratricopeptide repeat proteins.

The term antibody-like molecule further encompasses a polypeptide derived from protein A domains, a polypeptide derived from fibronectin domain FN3, a polypeptide derived from consensus fibronectin domains, a polypeptide derived from lipocalins, a polypeptide derived from Zinc fingers, a polypeptide derived from Src homology domain 2 (SH2), a polypeptide derived from Src homology domain 3 (SH3), a polypeptide derived from PDZ domains, a polypeptide derived from gamma-crystallin, a polypeptide derived from ubiquitin, a polypeptide derived from a cysteine knot polypeptide and a polypeptide derived from a knottin, a polypeptide derived from a cystatin, a polypeptide derived from Sac7d, a triple helix coiled coil (also known as alphabodies), a polypeptide derived from a Kunitz domain of a Kunitz-type protease inhibitor and a polypeptide derived from a carbohydrate binding module 32-2.

The term protein A domains derived polypeptide refers to a molecule that is a derivative of protein A and is capable of specifically binding the Fc region and the Fab region of immunoglobulins.

The term armadillo repeat protein refers to a polypeptide comprising at least one armadillo repeat, wherein an armadillo repeat is characterized by a pair of alpha helices that form a hairpin structure.

In the context of the present specification, the term humanized antibody refers to an antibody originally produced by immune cells of a non-human species, the protein sequences of which have been modified to increase their similarity to antibody variants produced naturally in humans.

The term humanized camelid antibody in the context of the present specification refers to an antibody consisting of only the heavy chain or the variable domain of the heavy chain (VHH domain) and whose amino acid sequence has been modified to increase their similarity to antibodies naturally produced in humans and, thus show a reduced immunogenicity when administered to a human being. A general strategy to humanize camelid antibodies is shown in Vincke et al. "General strategy to humanize a camelid single-domain antibody and identification of a universal humanized nanobody scaffold", J Biol Chem. 2009 Jan. 30; 284 (5): 3273-3284, and US2011165621A1, incorporated herein by reference.

In the context of the present specification, the term chimeric antibody refers to an antibody molecule in which the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, cytokine, toxin, hormone, growth factor, drug, etc. For example, an antibody can be modified by replacing its constant region with a cytokine. Due to the replacement with a cytokine, the chimeric antibody can retain its specificity in recognizing the antigen while having also the function, or part thereof, of the original cytokine molecule.

In the context of the present specification, the term aptamer refers to an oligonucleotide or peptide capable of specifically binding to another molecule or target with high affinity having a Kd≤10E-8 mol/l. An aptamer binds to its target similarly to the specific binding of an antibody. The term aptamer encompasses RNA or DNA molecules, nucleic acid analogues or peptide molecules. An aptamer may also be coupled to a self-cleaving RNA molecule, so-called ribozyme. Methods are known for obtaining aptamers de-novo; these include the so-called "selex" approach and other methods based on evolution of specific binders from a random selection.

In the context of the present specification, the term dissociation constant ($K_D$) is used in its meaning known in the art of chemistry and physics; it refers to an equilibrium constant that measures the propensity of a complex composed of [mostly two] different components to dissociate reversibly into its constituent components. The complex can be e.g. an antibody-antigen complex AbAg composed of antibody Ab and antigen Ag. $K_D$ is expressed in molar concentration [mol/l] and corresponds to the concentration of [Ab] at which half of the binding sites of [Ag] are occupied. In other words, the concentration of unbound [Ab] equals the concentration of the [AbAg] complex. The dissociation constant can be calculated according to the following formula:

$$K_D = \frac{[Ab] * [Ag]}{[AbAg]}$$

[Ab]: concentration of antibody; [Ag]: concentration of antigen; [AbAg]: concentration of antibody-antigen complex As used herein, the term "treating" or "treatment" of any disease or disorder (e.g. cancer) refers in one embodiment, to ameliorating the disease or disorder (e.g. slowing or arresting or reducing the development of the disease or at least one of the clinical symptoms thereof). In another embodiment "treating" or "treatment" refers to alleviating or ameliorating at least one physical parameter including those which may not be discernible by the patient. In yet another embodiment, "treating" or "treatment" refers to modulating the disease or disorder, either physically, (e.g., stabilization of a discernible symptom), physiologically, (e.g., stabilization of a physical parameter), or both. Methods for assessing treatment and/or prevention of disease are generally known in the art, unless specifically described hereinbelow.

DETAILED DESCRIPTION OF THE INVENTION

A first aspect of the invention relates to an agent for use in treatment of a haematologic malignancy, wherein the agent is selected from
  a. a non-agonist biopolymer ligand capable of specifically binding to LIGHT (UniProtKB: human_O43557) or LTβR (UniProtKB: human_P36941);
  b. a nucleic acid capable of specifically suppressing expression of LIGHT or LTβR.

Particular indications for which the invention is useful include forms of leukemia, lymphoma, myeloma, myeloproliferative diseae, myelodysplastic syndrome and more particularly, myeloid leukemiamyeloid leukemia, In certain embodiments, the agent for use in treatment of myeloid leukemia is a non-agonist biopolymer ligand specifically binding to LIGHT or LTβR.

In certain embodiments, the agent for use in treatment of myeloid leukemia is a nucleic acid capable of specifically suppressing expression of LIGHT or LTβR.

In certain embodiments, the non-agonist biopolymer ligand is an antibody, antibody fragment, antibody-like molecule or aptamer.

In certain embodiments, the non-agonist biopolymer ligand is a human antibody or a humanized antibody. In certain particular embodiments, the non-agonist biopolymer ligand is a neutralizing antibody selected from a human antibody and a humanized antibody, each of which are specifically binding in a non-agonist fashion to one of LIGHT and LTβR.

In certain embodiments, the binding of the non-agonist biopolymer ligand to LIGHT or LTβR is characterized by a $K_D$ of smaller than (<) $10^{-7}$. In certain embodiments, the binding of the non-agonist biopolymer ligand to LIGHT or LTβR is characterized by a $K_D < 10^{-8}$. In certain embodiments, the binding of the non-agonist biopolymer ligand to LIGHT or LTβR is characterized by a $K_D < 10^{-9}$.

A second aspect of the invention relates to a nucleic acid molecule encoding the agent according to the first aspect for use in treatment of myeloid leukemia.

In certain embodiments, the nucleic acid molecule for use in treatment of myeloid leukemia is a DNA molecule or an RNA molecule.

In certain embodiments, the invention relates to a nucleic acid expression vector comprising the nucleic acid molecule of the second aspect for use in treatment of myeloid leukemia.

In certain embodiments, the nucleic acid expression vector for use in treatment of myeloid leukemia is selected from:
  a. a nucleic expression construct selected from a DNA plasmid, a double stranded linear DNA, and a single stranded RNA, wherein optionally said nucleic acid expression construct is encapsulated in a lipid vesicle, and
  b. a virus, particularly a lentivirus, a herpesvirus, an adenovirus and an adeno-associated virus.

In certain embodiments, the haematologic malignancy is myeloid leukemia, particularly chronic myeloid leukemia. In certain embodiments, the haematologic malignancy is acute myeloid leukemia.

In certain embodiments, the invention relates to the agent according to the first aspect or the nucleic acid molecule or the nucleic acid vector according to the second aspect for use in treatment of myeloid leukemia, wherein the haematologic malignancy is selected from leukemia, lymphoma, myeloma, myeloproliferative diseae, myelodysplastic syndrome, particularly from CML and AML.

A third aspect of the invention relates to a pharmaceutical composition for use in treatment of a haematologic malignancy in a patient, comprising the agent according to the first aspect or the nucleic acid molecule or the nucleic acid vector according to the second aspect, and a pharmaceutically acceptable carrier. In certain embodiments, the pharmaceutical composition is formulated as an administration form for parenteral administration. In certain embodiments, the pharmaceutical composition is formulated for intravenous administration.

Wherever alternatives for single separable features such as, for example, an antibody or a medical indication are laid out herein as "embodiments", it is to be understood that such alternatives may be combined freely to form discrete embodiments of the invention disclosed herein. Thus, any of the alternative embodiments for an antibody may be combined with any of the alternative embodiments of ligand and these combinations may be combined with any medical indication or therapeutic method mentioned herein.

The invention is further illustrated by the following examples and figures, from which further embodiments and advantages can be drawn. These examples are meant to illustrate the invention but not to limit its scope.

EXAMPLES

Materials and Methods

Mice

Figure 1:
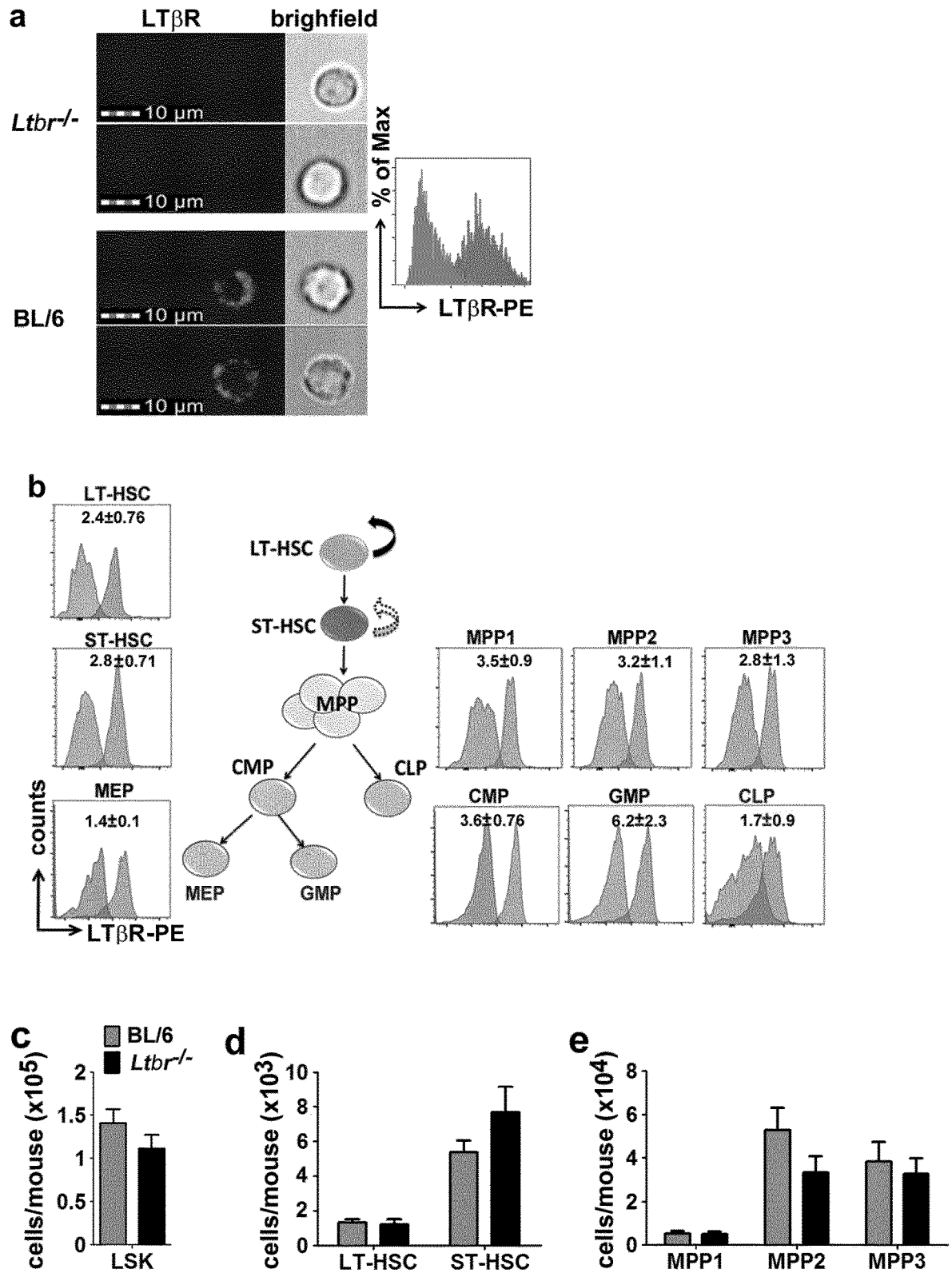
FIG. 1 LTβR expressed by LSKs prevents exhaustion of HSCs. (a) Left: LTβR expression (red) on BL/6 and Ltbr$^{-/-}$ FACS-sorted BM LSKs analyzed by ImageStream$^X$. Right: ImageStream$^X$ histogram of LTβR expression on Ltbr$^{-/-}$ LSKs (grey) vs. BL/6 LSKs (red). (b) Representative FACS histograms of LTβR expression on BM LSK subsets and myeloid progenitor cells. Numbers in plots indicate the ratio MFI stain/isotype (n=5). (c-f) Absolute numbers of LSKs (c), LT/ST-HSCs (d), MPPs (e), CLPs and myeloid progenitors (MEP, CMP, GMP) (f) in the BM of naïve BL/6 (n=6) and Ltbr$^{-/-}$ (n=6) mice. (g) Fold change in CFU of Ltbr$^{-/-}$ LSKs relative to BL/6 LSKs in serial re-platings in vitro (n=5, 1 of 2 independent experiments). (h) Schematic of mixed BM chimera and serial re-transplantation (n=5 (1$^{st}$), n=4 (2nd), n=3 (3$^{rd}$). (i-n) Percentages of Ly5.1 and Ltbr$^{-/-}$ Lin$^-$ cells (i) and LSK subsets (j-n) in the BM, analyzed 16 weeks post-transplantation. 1 of 2 independent experiments is shown. Data are shown as mean±SEM. Statistics: *P<0.05, P<0.01, *P<0.001 (two-tailed t-test); only P<0.05 are shown.
Figure 1:
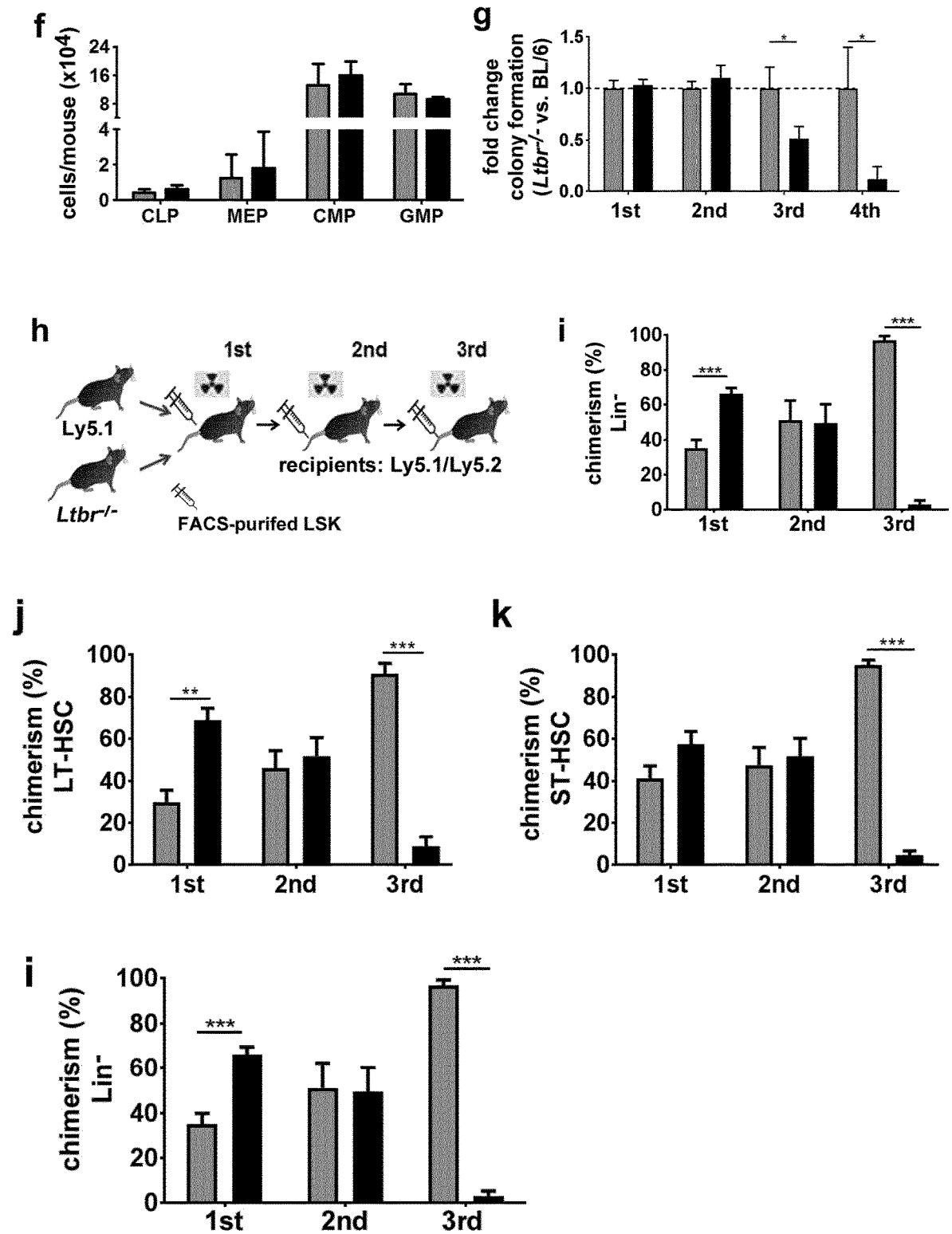
Figure 1:
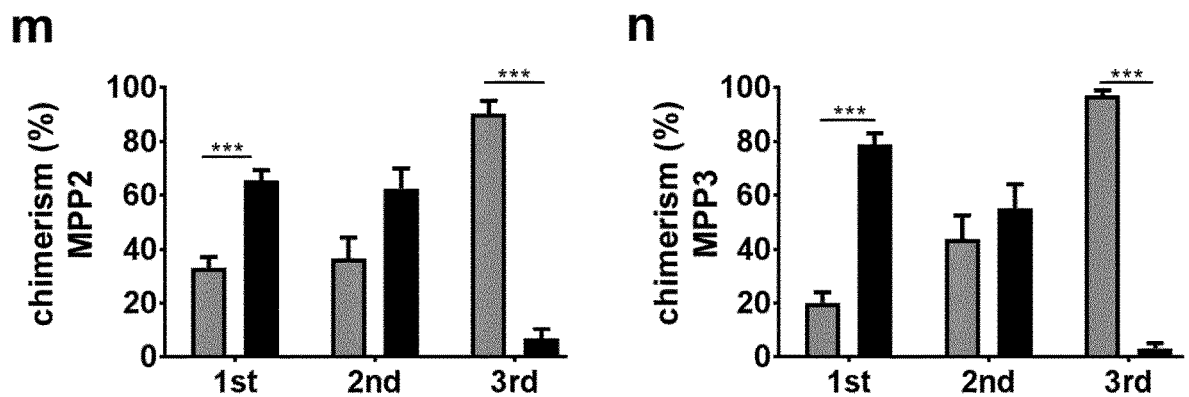

BL/6 and Ly5.1 mice were purchased from Charles River. $Ltbr^{-/-}$ mice were kindly provided by Prof. A. Aguzzi (Institute of Neuropathology, University Hospital of Zurich, Switzerland; Fütterer et al 1998, Futterer, A., Mink, K., Luz, A., Kosco-Vilbois, M. H. & Pfeffer, K. Immunity 9, 59-70 (1998)). $Light^{-/-}$ mice were kindly provided by S. Scheu (University Hospital of Düsseldorf, Germany). In some experiments, offspring mice from Ly5.1×BL/6 breeding are used as recipient mice (referred to as Ly5.1/Ly5.2). Animal experiments were approved by the local experimental animal committee of the Canton of Bern and performed according to Swiss laws for animal protection.

CML Mouse Model

FACS-purified LSKs were transduced by spin-infection with BCR-ABL1-GFP retrovirus. CML was induced by intravenous (i.v) injection of 30.000 transduced LSKs into non-irradiated recipient mice (BL/6→BL/6: BL/6 CML; $Ltbr^{-/-}$→BL/6: $Ltbr^{-/-}$ CML). Retrovirus particles were produced and titrated as described previously (Mumprecht, S., et al. Blood 113, 4681-4689 (2009)). CML development was monitored as described earlier (Mumprecht, S., Schurch, C., Schwaller, J., Solenthaler, M. & Ochsenbein, A. F. Blood 114, 1528-1536 (2009)). Blood counts were analyzed using a Vet abc Animal Blood Counter (Medical Solution GmbH, Bassersdorf, Switzerland). For secondary transplantations, 5×10$^6$ BM cells or 20.000 FACS-purified LSCs from primary CML mice (18-20 days after primary transplantation) were injected i.v. into secondary immunocompetent recipients.

Treatment with 5-FU

BL/6, Ly5.1 and $Ltbr^{-/-}$ mice were injected intraperitoneally (i.p.) with 150 mg/kg 5-FU (Sigma). Eight to nine days post-injection, BM cells were harvested and analyzed or whole BM cells from Ly5.1 and $Ltbr^{-/-}$ mice were injected at a ratio of 1:1 (1.5×10$^6$BM cells, from each genotype) into lethally irradiated Ly5.1/Ly5.2 recipients (2×6.5 Gy with 4-hour interval, Gammacell 40 exactor, Best Theratronics, Ottawa, Canada).

Generation of Chimeric Mice

FACS-sorted LSKs from Ly5.1, Ltbr$^{-/-}$ or Light$^{-/-}$ mice were injected i.v. at a ratio of 1:1 (17.000-20.000 cells) into lethally irradiated Ly5.1/Ly5.2 mice or congenic Light$^{-/-}$ (Ly5.1/Ly5.2) recipient mice. Chimerism was assessed in peripheral blood at different time points by FACS. Serial re-transplantation experiments were performed 12-18 weeks after primary transplantation. Ly5.1 and Ltbr'LSKs from chimeras were FACS-sorted and injected i.v. at a ratio of 1:1 into lethally irradiated Ly5.1/Ly5.2 recipient mice. If fewer than 5000 LSKs were available for re-transplantation ($3^{rd}$, $4^{th}$ transplantation), additional 100000 rescue BM cells from were injected i.v.

Homing Assay

Ly5.1 and Ltbr$^{-/-}$ LSKs were FACS-sorted and 26.000 to 54.000 LSKs were injected at a ratio of 1:1 into lethally irradiated Ly5.1/Ly5.2 recipients. Thirteen hours post-transplantation the frequency of LSKs homed to the BM cells was analyzed by FACS. The frequency of Lin$^{-/-}$ CD45.1$^+$ and Lin$^-$CD45.2$^+$ cells was calculated as percentage of transplanted LSKs.

Isolation of BM Cells and Lineage Depletion

Mice were sacrificed; femurs, tibiae, humeri and the spine were crushed in PBS using a mortar and pestle. The BM suspension was filtered through a 40 µm cell strainer. Subsequently red blood cell lysis was performed and cells were washed twice with PBS. Lineage depletion was performed with via MACS separation according to manufacturer's protocol. Briefly, BM cells were stained with biotinylated antibodies (all BioLegend, San Diego, USA) against red cell precursors (αTer119), B cells (αCD19), T cells (αCD3E), myeloid cells (αGr1) and α-biotin MicroBeads using LS columns (Miltenyi Biotec, Bergisch Gladbach, Germany).

Isolation of BM Niche Cells

BM mesenchymal stromal cells (MSC), endothelial cells (EC) and osteoblasts were isolated according to (Schepers, K., et al. Cell stem cell 13, 285-299 (2013)). Briefly, bones were cleaned, crushed and digested with collagenase and DNase as descried in (Schepers, K., Hsiao, E. C., Garg, T., Scott, M. J. & Passegue, E. Blood 120, 3425-3435 (2012)). Isolated cells were stained with αCD31-FITC (390) αCD51-APC (RMV-7) αLy-6A/E-PerCP-Cy5.5 (D7, all BioLegend, San Diego, USA) and Streptavidin-V500 (BD bioscience, Eysins, Switzerland) and hematopoietic cells were excluded using anti-lineage antibodies (αTer119, αCD19, αCD3ε and αGr1, αCD45 (30F11)). BM niche cells were characterized using the following surface markers; EC: CD45$^-$CD31$^+$ sca1$^+$, MSC: CD45$^-$Lin$^-$CD31$^-$Sca1$^+$CD51$^+$ and Osteoblasts: CD45$^-$Lin$^-$CD31$^-$Sca1$^-$CD51$^+$.

Flow Cytometry and Cell Sorting

LSKs, LSK subsets and progenitors were characterized as described (Wilson, A., et al. Annals of the New York Academy of Sciences 1106, 64-75 (2007)). Cells were stained in PBS/5% FCS with following antibodies for 30 min at 4° C.: αCD117-APC-Cy7 (2B8), αCD48-PE-Cy7 (HM48-1), αCD150-APC (TC1512F12.2), αLy-6A/E-PerCP-Cy5.5, -APC (D7, eBioscience, San Diego, USA), αCD16/CD32-PE-Cy7 (93), αCD34-eFluor-450 (RAM34, eBioscience, San Diego, USA), αCD135-PE, -biotin (A2F10, Novus, Littleton, USA), αCD127-FITC (A7R34), αCD45.1-PerCP-Cy5.5 (A20), αLTβR-PE (ebio3C8, eBioscience, San Diego, USA), αLy-6C-PerCP-Cy5.5 (HK1.4), αCD11b-PE-Cy7, αCD8a-FITC, -APC, FITC (53-6.7), αCD4 (GK1.5), αCD90.1-APC (OX-7), αCD90.2-APC (30-H12), Annexin-V-Pacific-Blue, -Alex-647, PE, αLy-6G-Pacific-Blue, αCD45.2-Alexa-700 (104), Ki67-PE (16A8), rat IgG2a,κ-PE (RTK2758), αCD45-PerCP-Cy5.5, -PE-Cy7, -APC (30-F11). Human HSPCs were stained with αCD90-PeCP-Cy5.5 (5E10), αCD34-APC (561), αLTβR-PE (31G4D8), αCD38-APC (HIT2), mouse-IgG2b,κ (MPC-11), αCD2-biotin (RPA2.10), αCD3$_ε$-biotin (OKT3), αCD14-biotin (HCD14), αCD16-biotin (3G8), αCD19-biotin (HIB19), αCD56-biotin (HCD56), αCD235a-biotin (HIR2), αCD45-Pacific-Blue (2D1), Streptavidin-V500 (all from BioLegend, San Diego, USA). FACS was performed on a LSR Fortessa cell analyzer or LSRII Flow cytometer (both BD Bioscience, San Jose, USA). Cell-sorting was done using a BD FACSARIA III (BD Bioscience, San Jose, USA). Data analysis was performed with Kaluza Flow analysis software (Beckman Coulter, Krefeld, Germany) or FowJo software (Treestar, Oregon, USA).

Cell Cycle Analysis

Ki67 staining was performed according to manufacturer's protocol. Briefly, LSKs were FACS-purified, fixed and permeabilized (FOXP3 Fixation/Permeabilization concentrate/ diluent, eBioscience, San Diego, USA). Following Ki67-PE or isotype control staining, cells were stained with DAPI for 30 min at 4° C. and subsequently analyzed by flow cytometry. BrdU incorporation was used to determine proliferation rate of naïve HSCs. BrdU was administered twice i.p. 2 mg/mouse. Injections were administered 24 h and 12 h prior to analysis. BrdU incorporation was determined according to manufacturer's protocol (BD Pharmingen BrdU Flow Kits, San Jose, USA).

Image Stream Analysis

FACS-sorted LSKs from chimeric mice (6 to 14 weeks after transplantation) and from 5-FU treated BL/6 and Ltbr$^{-/-}$ mice (eight days after treatment) were fixed with 4% Paraformaldehyd and Numb staining was performed as described (Schurch, C., Riether, C., Matter, M. S., Tzankov, A. & Ochsenbein, A. F. The Journal of clinical investigation 122, 624-638 (2012)). DAPI (Merck, Darmstadt, Germany) was used to counterstain for DNA. LSKs were acquired using an ImageStreamX Mark II imaging flow cytometer (Merck, Darmstadt, Germany). Cells were analyzed using INSPIRE and IDEAS Software. Symmetric and asymmetric cell division was determined by the Numb intensities in two daughter cells as described (Riether, C., et al. The Journal of experimental medicine 214, 359-380 (2017)).

Colony-Forming Assays (CFU)

CFU assays were performed with FACS-purified BM LSKs: ($1\times10^3$ naive LSKs; $1\times10^4$ 5-FU treated Lin$^-$sca1$^+$). Cells were plated in MethoCult (STEMCELL Technologies, Cambridge, USA) supplemented with 15% FCS, 20% BIT (50 mg/ml BSA in IMDM, 1.44 U/ml rh-insulin and 250 ng/ml human holo-transferrin, 100 µM 2-mercaptoethanol, 100 U/ml penicillin, 100 µg/ml streptomycin, 2 mM L-glutamine, 50 ng/ml stem cell factor (rmSCF-1), 10 ng/ml Interleukin-3 (rmIL-3), 10 ng/ml Interleukin-6 (rhIL-6) and 50 ng/ml fms-related tyrosine kinase 3 ligand (rmFLTL-3). Colonies were enumerated after 7d in culture (≥30 cells/ colony) on a DMIL inverted microscope (Leica, Wetzlar, Germany) equipped with an Intensilight C-HGFI unit (Nikon, Tokio, Japan). Re-plating was performed with 10.000 cells per dish and counted after 7 days.

RNA Isolation and Quantitative RT-PCR (qRT-PCR)

RNA was isolated according to manufacturer's protocol (NucleoSpin RNA XS, Macherey Nagel, USA) and the expression of genes was analyzed using SYBR Green 2×PCR Master Mix (Roche, NY, USA) on a 7500 real-time PCR System (AB Biosystems, CA, USA). Actin or Gapdh genes were used for normalization of the gene expression.

RNA Isolation, cDNA Synthesis for Fluidigm Array

RNA was isolated from FACS-purified LSKs 6 weeks post-transplantation using RNeasy Micro Kit (QIAGEN AG, Basel, Switzerland) according the optimized protocol (Radpour, R., et al. *PloS one* 6, e27355 (2011)). The quantity of extracted RNA was assessed using a NanoDrop ND-1000 spectrophotometer (Biolab, Mulgrave, VIC, Australia). For each sample, the extracted RNA was used to synthesize cDNA using the High Capacity cDNA Reverse Transcription Kit (AB, CA, USA).

RNA Isolation and Quantitative RT-PCR (qRT-PCR)

RNA was isolated according the manufacturer's protocol (NucleoSpin RNA XS, Macherey Nagel, PA, USA) and the expression of genes was analyzed using SYBR Green 2×PCR Master Mix (Roche, NY, USA) on a 7500 real-time PCR System (AB Biosystems, CA, USA). Actin or Gapdh genes were used for normalization of the gene expression Gene Expression Profiling Using Fluidigm Array Gene expression profiling was performed with FACS-purified LSKs from chimeric mice 6 weeks after transplantation using the Fluidigm 96.96 Dynamic Array on a BioMark system (Fluidigm, San Francisco, USA) according to the manufacturer's protocol (Wong, C. C., et al. *Nature biotechnology* 28, 1115-1121 (2010)). Assays were designed based on EvaGreen chemistry and primers for targeting desired pathways were designed accordingly for amplicons of 100-160 bp using Primer3Plus (Untergasser, A., et al. *Nucleic acids research* 35, W71-74 (2007)). Briefly, FACS-purified LSKs were subjected for total RNA isolation using RNeasy Micro Kit (QIAGEN AG, Basel, Switzerland) according to the optimized protocol (Radpour, R., et al. *PloS one* 6, e27355 (2011)). The quantity of extracted RNA was assessed using a NanoDrop ND-1000 spectrophotometer (Biolab, Mulgrave, VIC, Australia). For each sample, the extracted RNA was used to synthesize cDNA using the High Capacity cDNA Reverse Transcription Kit (AB, CA, USA). cDNA was pre-amplified with a mix of primers specific to the target genes as the specific target amplification (STA) for 15 cycles. STA products were then diluted fivefold and analyzed with TaqMan Gene Expression Master Mix and EvaGreen DNA binding dye in a 96:96 Fluidigm dynamic array. Ct values were calculated and visualized using BioMark real-time PCR analysis software (Fluidigm, San Francisco, USA). Each assay was performed in replicate.

Genes with Ct values of higher than 35.0 or differences of ≥1.0 in-between sample replicates were eliminated from the analysis. If the reference genes (Actb and Gapdh) were not expressed or differences of ≥1.0 in-between sample replicates were observed, the sample was not included in the analysis. Raw values were normalized using geometric mean of two reference genes (Actb and Gapdh). The fold difference for each sample was calculated using the comparative Ct method (Livak, K. J. & Schmittgen, T. D. *Methods* 25, 402-408 (2001)). Relative gene expression quantities after log 2 transformation were used for data analysis. Data were clustered using standard Euclidean's method based on the average linkage. Heatmaps were generated according to the gene expression pattern for each sample.

Cell Signaling and in Silico Pathway Analysis

Gene networks representing differentially expressed genes were identified using the Ariadne Genomics Pathway Studio database (Elsevier, Berlin, Germany).

Transfection of Human HSPCs with siRNA

FACS-purified BM HSPCs from patients undergoing a diagnostic BM aspirated that was considered normal by the hematologist and pathologist (healthy donor) or CML patients were cultured in StemSpan medium and transfected with control siRNA (siCTRL) or LTbR targeting SiRNA (siLTBR) (SantaCruz Biotechnology, Heidelberg, Germany) using TransIT-X2 (Mirus Bio Muttenz, Switzerland) according to manufacturer's protocol. 24-48 h hours after transfection, HSPCs were harvested for further experiments (e.g. CFU-assays and qRT-PCR).

Statistical Analysis

Statistics were calculated using Prism 7.0 (Graph Prism Software, USA). Unless otherwise noted, Students t-test was used to determine statistical significance. Survival curves were analyzed using a log-rank (Mantel-Cox) test. Data are displayed as mean±SEM. *, P<0.05; , P<0.01; *, P<0.001, ****P<0.0001.

Accession Numbers

Expression data were derived from a public repository for microarray data (GEO) and are available under accession nos. GSE32719, GSE4170 (Pang, W. W., et al. *Proceedings of the National Academy of Sciences of the United States of America* 108 (50), 20012-20017 (2011)) and GSE11675 (Lemoli, R. M., et al. *Blood* 114, 5191-5200 (2009)).

Example 1

First, the inventors analyzed the expression of LTβR on different murine hematopoietic stem/progenitor cell (HSPC) subsets during homeostasis. ImageStreamX analysis of FACS-purified LSKs from BM revealed a strong surface expression of LTβR (FIG. 1A). In addition, defined LSK subpopulations such as LT-HSCs ($CD150^+CD48^-CD34^-CD135^-$), ST-HSCs ($CD150^+CD48^-CD34^+CD135^-$), MPPs (MPP1: $CD150^+CD48^+CD34^+CD135^-$; MPP2: $CD150^-CD48^+CD34^+CD135^-$; MPP3: $CD150^-CD48^+CD34^+CD135^+$) as wells as common myeloid progenitors (CMPs: $CD34^+Fc\gamma RII/III$ c-kit$^+$sca1$^-$), common lymphoid progenitors (CLP: $CD127^+$c-kit$^{int}$sca1$^-$Thy1.1$^-$), granulocyte-macrophage progenitors (GMPs: $CD34^+Fc\gamma RII/III^+$c-kit$^+$sca1$^-$) and megakaryocyte-erythroid progenitor cells (MEPs: $CD34$ $Fc\gamma RII/III^-$c-kit$^+$sca1$^-$) expressed LTβR as analyzed by FACS (FIG. 1b). Furthermore, differentiated myeloid cells in the BM and peripheral blood (PB) expressed LTβR, whereas T- and B-lymphocytes only marginally expressed LTβR.

To analyze the functional relevance of LTβR expressed on hematopoietic cells, the inventors first compared hematopoiesis in naïve BL/6 and Ltbr$^{-/-}$ mice. BL/6 and Ltbr$^{-/-}$ mice had similar numbers of LSKs (LT-HSC, ST-HSC, MPPs), lymphoid progenitors (CLPs) and myeloid progenitors (GMP, CMP, MEP) in the BM (FIG. 1c-f). In addition, BL/6 and Ltbr$^{-/-}$ LSKs had a comparable cell cycle activity and apoptosis rate. Moreover, FACS-sorted LSKs from BL/6 and Ltbr$^{-/-}$ mice formed similar numbers of colonies in methylcellulose ex vivo (FIG. 1g). Since not only HSCs but also early progenitor cells form colonies ex vivo in methylcellulose, the inventors analyzed the self-renewal capacity of long-term HSCs in serial re-plating experiments. Ltbr$^{-/-}$ LSKs lost the capacity to form colonies in methylcellulose after the 3$^{rd}$ and 4$^{th}$ replating, indicating that LTβR-signaling contributes to the self-renewal of HSCs (FIG. 1g).

Since differences between BL/6 and Ltbr$^{-/-}$ HSCs only became apparent in serial re-plating assays in vitro that require cell expansion and differentiation, the inventors determined the function of LTβR signaling on LSKs in vivo in a competitive repopulation experiment (FIG. 1h). The inventors first injected congenic Ltbr-proficient (Ly5.1+, referred to as Ly5.1) LSKs and Ltbr-deficient (Ly5.2+, referred to as Ltbr$^{-/-}$) LSKs into lethally irradiated Ly5.1/Ly5.2 recipient mice. Importantly, injected LSKs homed to the BM independent of LTβR expression. However, Ltbr$^{-/-}$ LSKs reconstituted recipient mice more efficiently than control LSKs resulting in >60% Ltbr-deficient Lin$^-$ cells in the BM 16 weeks post-transplantation (FIG. 1$i$). This was also reflected by a significant higher fraction of all HSPC subpopulations (FIG. 1$j$-$n$) in the BM and higher numbers of Ltbr-deficient leukocytes in peripheral blood (PB).

Figure 8:
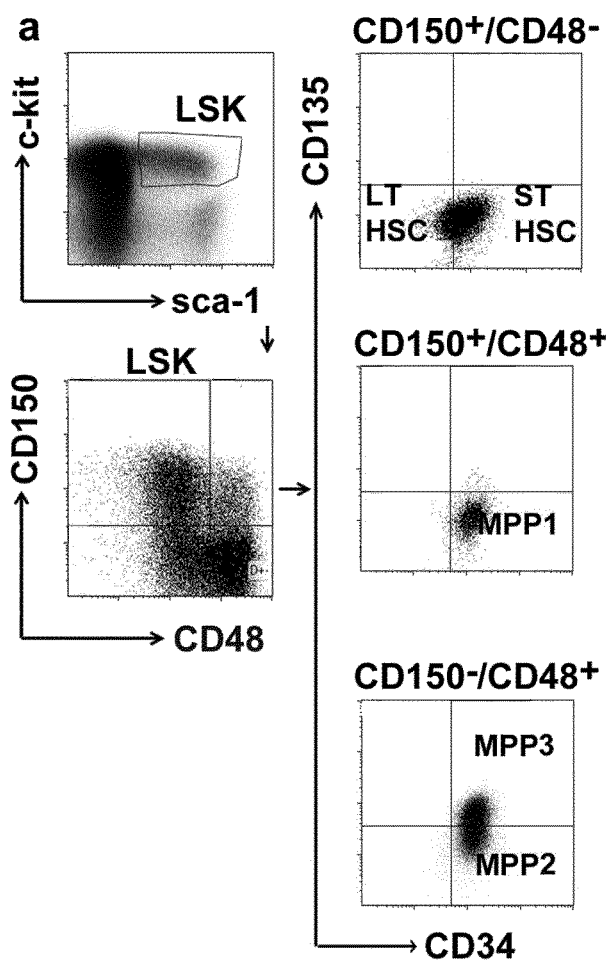
FIG. 8 LTβR is dispensable in steady state hematopoiesis but is crucial for reconstitution after hematopoietic stress. (a) Gating strategy of LSK subsets (LT-HSC, ST-HSC, MPP1, MPP2, MPP3). (b) Representative histogram of LTbR expression on indicated differentiated cells in blood and BM of naïve BL/6 mice. (grey: isotype control, red: LTbR staining). (c) Cell cycle analysis of naïve BL/6 and $Ltbr^{-/-}$ LSKs. Representative FACS dot plots and the percentage of cells in G0-1, S and G2-M phase are shown (n=4-6). (d) Percentages of Annexin-V$^+$ LSKs, LSK subsets and progenitor subsets in the BM of naïve BL/6 and $Ltbr^{-/-}$ mice (n=4-5). (e) Homing of Ly5.1 and $Ltbr^{-/-}$ LSKs to the BM (% of CD45.1 and CD45.2 LSKs in the BM of Ly5.1/Ly5.2 mice relative to the numbers of total injected LSKs, n=3). (f) Cell numbers of Ly5.1 and $Ltbr^{-/-}$ BM Lin$^-$ cells in $1^{st}$, $2^{nd}$ and $3^{rd}$ transplantation. (g-j) Percentage of Ly5.1 and $Ltbr^{-/-}$ GMPs (h), CMPs (i), MEPs (j) and CLPs (k) in $1^{st}$, $2^{nd}$ and $3^{rd}$ transplantation. Data are shown as mean±SEM of n=5 ($1^{st}$), n=4 ($2^{nd}$), n=3 ($3^{rd}$) mice. (k-m) Numbers of Ly5.1 and $Ltbr^{-/-}$ leukocytes in Ly5.1/Ly5.2 recipients at indicated time points after $1^{st}$ (1), $2^{nd}$ (m) and $3^{rd}$ (n) transplantation. Data are depicted as mean±SEM. Statistics: *P<0.05, P<0.01, *P<0.001 (two-tailed t-test).
Figure 8:
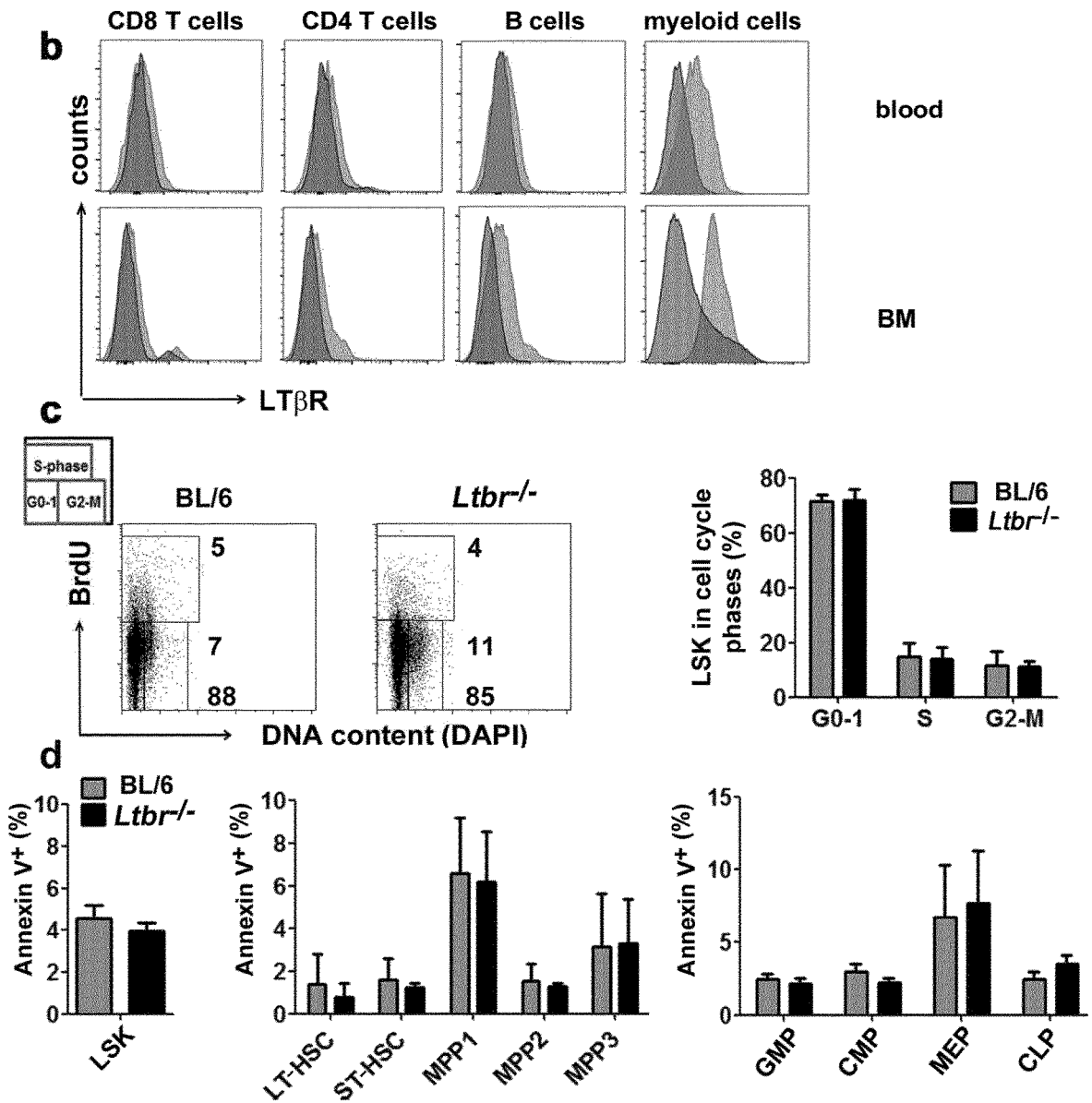
Figure 8:
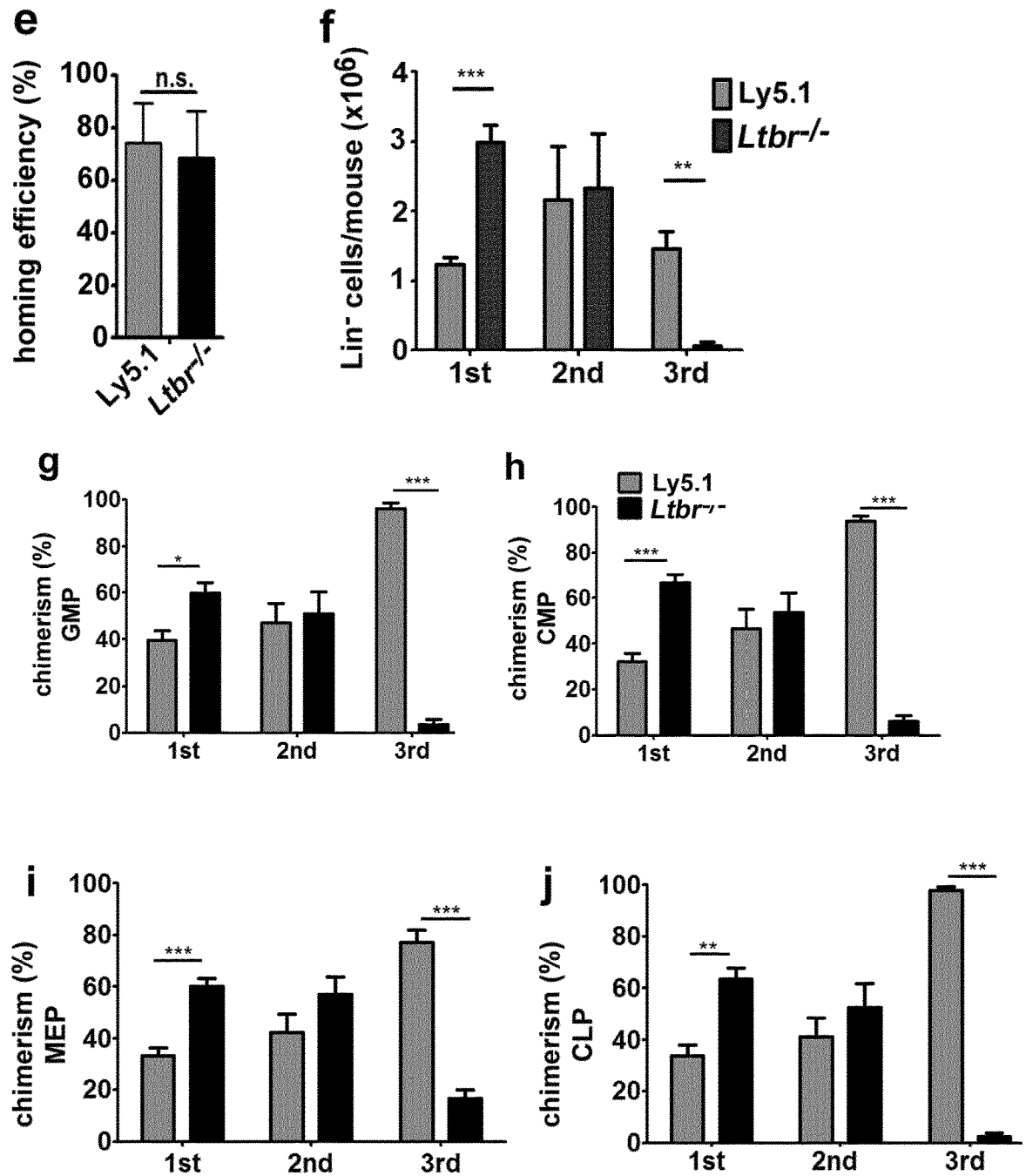
Figure 8:
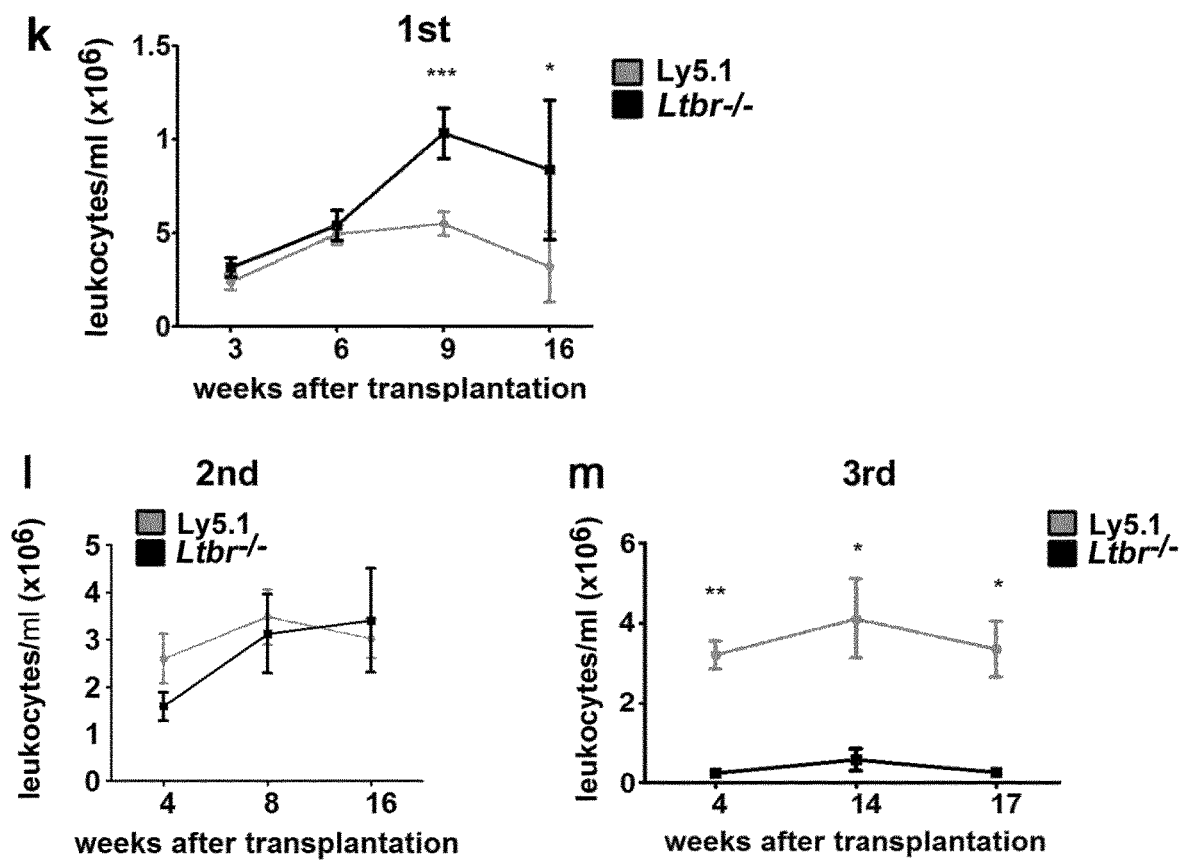

To study the self-renewal capacity of HSCs, the inventors performed serial transplantations with equal numbers of FACS-purified Ltbr$^{-/-}$ and Ly5.1 LSKs. This resulted in a comparable reconstitution of HSPCs in the 2$^{nd}$ transplantation (FIG. 1$i$-$n$) and similar numbers of Ltbr-competent and -deficient leukocytes in blood. Importantly, Ltbr$^{-/-}$ LSKs lost the capacity to reconstitute hematopoiesis in the 3$^{rd}$ transplantation, resulting in only approximately 3% Ltbr$^{-/-}$ HSPCs in BM and differentiated leukocytes in blood (FIG. 1$i$-$n$, FIG. 8$m$). Taken together, these data indicate that LTβR signaling crucially contributes to self-renewal of HSCs.

Example 2

Figure 2:
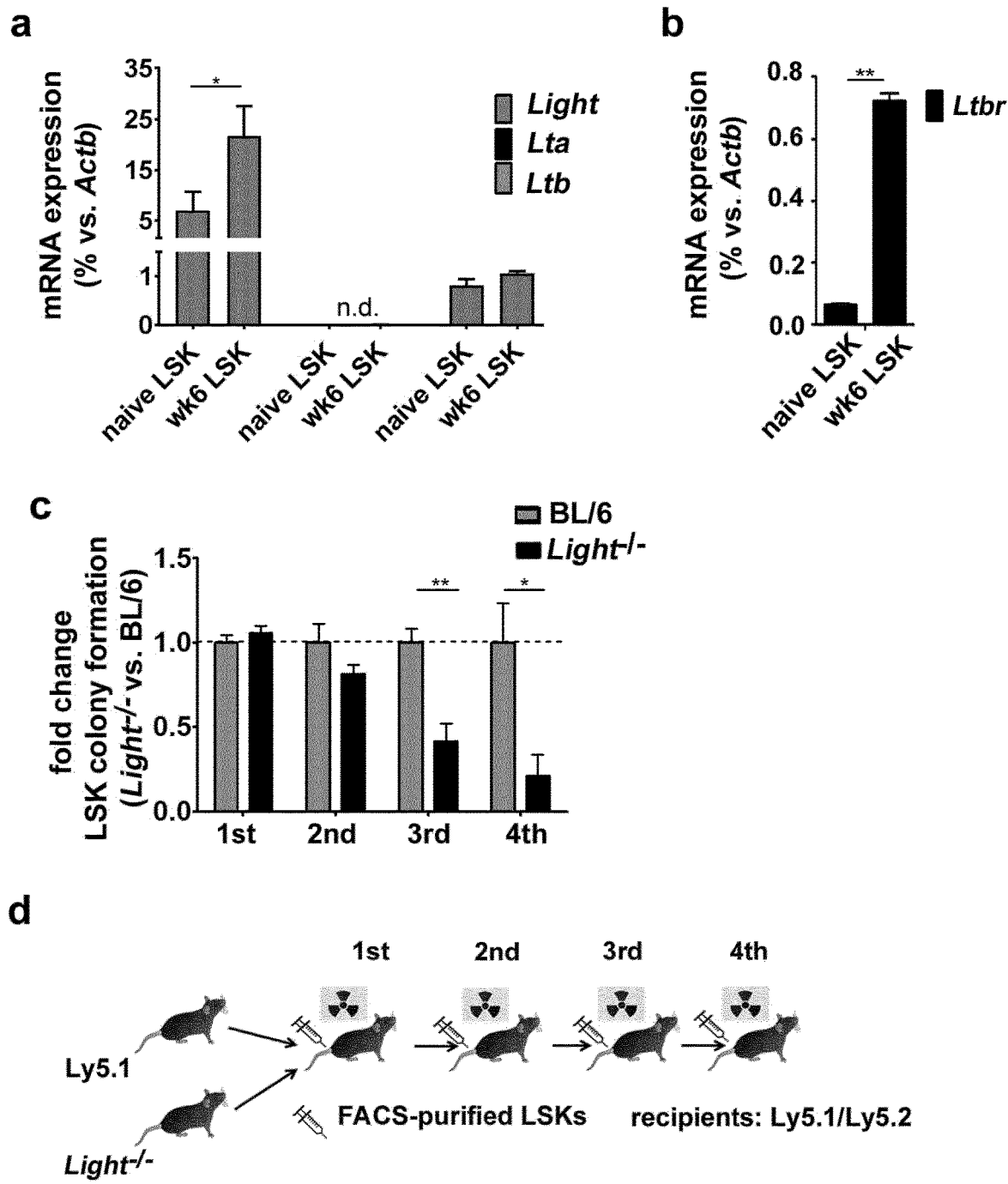
FIG. 2 LIGHT expressed by LSKs prevents exhaustion of HSCs. (a) Relative mRNA expression of Light, Lta, Ltb by FACS-sorted LSKs from naïve mice (n=3) and 1$^{st}$ chimeras six weeks post-transplantation (n=4). (b) Relative mRNA expression of Ltbr by FACS-sorted LSKs from naïve mice (n=3) and 1$^{st}$ chimeras six weeks after transplantation (n=4). (c) Fold change in colony formation of Light$^{-/-}$ BM LSKs relative to BL/6 BM LSKs in serial re-platings (n=6, one out of two independent experiments) (d) Experimental scheme for serial translations of Light$^{-/-}$ and Ly5.1 LSKs (1:1) into lethally irradiated Ly5.1/Ly5.2 recipients. (e-i) Chimerism in percentages of donor Lin$^-$ cells (e), LT-HSCs (f), ST-HSCs (g), MPP1 h), MPP2/3 (Lin$^-$ c-kit$^+$ sca1$^+$ CD150$^-$ CD48$^+$) (i) in BM from recipient mice 12-17 weeks after transplantations. Data are shown as mean±SEM of n=7 (1$^{st}$), n=6 (2nd), n=3 (3$^{rd}$, 4th) mice. (j) Experimental scheme of the serial transplantation of Ly5.1 and Light$^{-/-}$ LSKs (1:1) into lethally irradiated Ly5.1/Ly5.2 and congenic Light$^{-/-}$ recipients. (k-n) Percentages of donor Lin$^+$ cells (k, l) LSKs (m, n) in Ly5.1/Ly5.2 (k, m) and congenic Light$^{-/-}$ (l, n) recipients 12-17 weeks after transplantation. Data are shown as mean±SEM, Ly5.1/Ly5.2 recipients: n=7 (1$^{st}$), n=5 (2nd), n=3 (3$^{rd}$); n=3 (4th) Light$^{-/-}$ recipients: n=5 (1$^{st}$), n=5 (2nd), n=3 (3$^{rd}$), n=3 (4th). 1 of 2 independent experiments is shown. Statistics: *P<0.05, P<0.01, *P<0.001, ****P<0.0001 (two-tailed t-test), only P<0.05 are shown.
Figure 2:
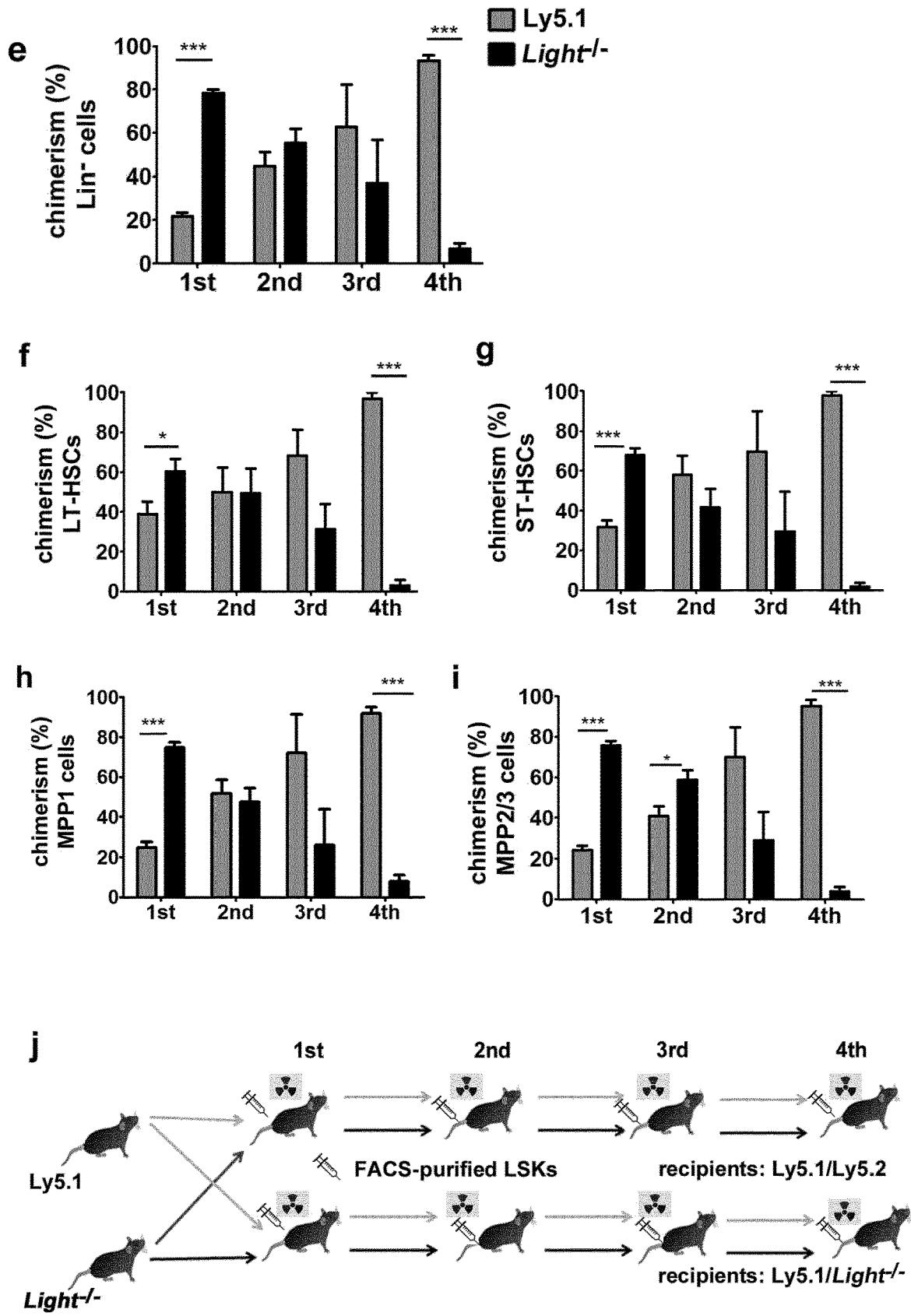
Figure 2:
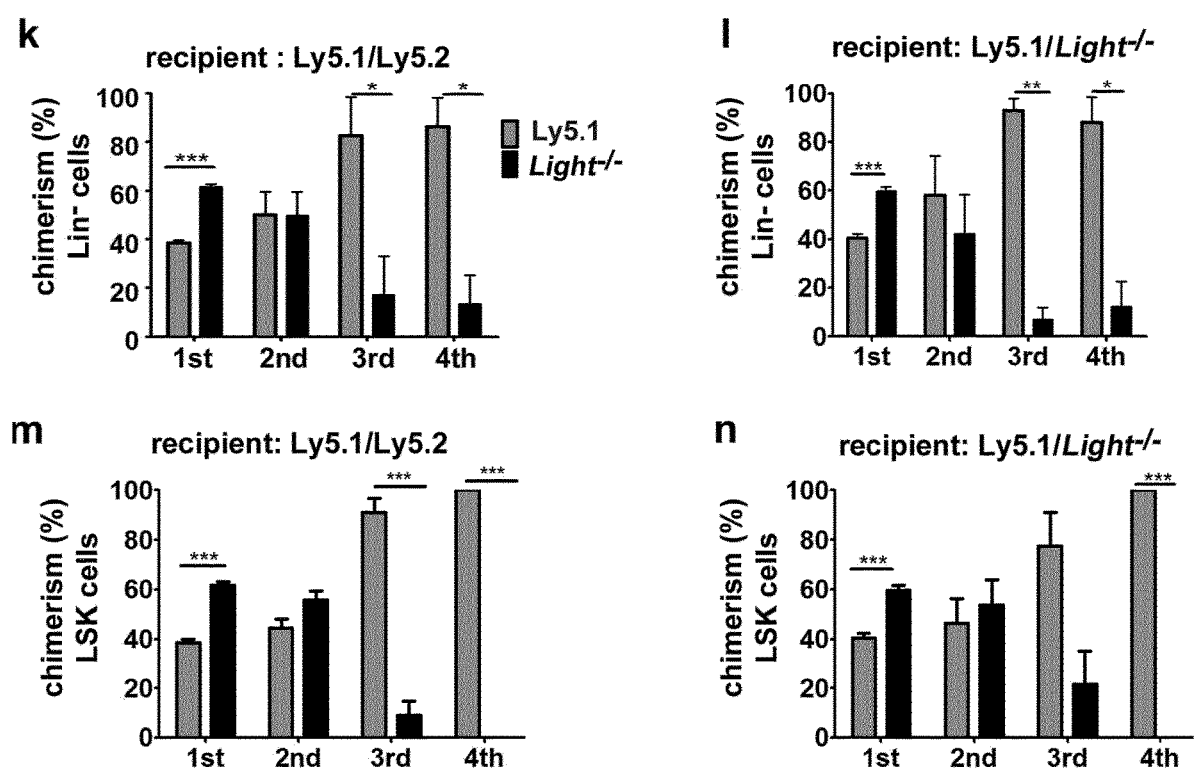

LTβR signaling can be induced by LTα, LTβ and LIGHT. Therefore, the inventors analyzed mRNA expression of these ligands in naïve Ly5.1 LSKs and BM niche cells, such as osteoblasts, ECs and MSCs. In addition, FACS-purified Ly5.1 LSKs from chimeras 6 weeks post-transplantation were analyzed (FIG. 2$a$). Lta and Ltb mRNA was expressed at very low levels in LSKs from both naïve and chimeric mice. However, Light was expressed in naïve LSKs and its expression was increased approximately 2.5-fold in Ly5.1 LSKs isolated from chimeric mice (FIG. 2$a$). In contrast, LTβR ligands were only expressed at low levels in BM niche cells with the exception of osteoblasts that showed higher Light expression. Interestingly, Ltbr mRNA expression in LSKs from chimeric mice 6 weeks post-transplantation was increased approximately 12-fold when compared to naïve LSKs (FIG. 2$b$).

The high expression of LIGHT on LSKs prompted us to analyze its role in the maintenance and regulation of HSPCs. Similar to the presented results in Ltbr$^{-/-}$ mice, the HSPC composition in the BM of naïve BL/6 and Light$^{-/-}$ mice was comparable. In addition, no differences were found in cell cycle activity and apoptosis rate of LSKs in the absence of Light (data not shown). To further elucidate whether LIGHT induced LTβR signaling regulates LSK colony formation capacity in vitro, the inventors performed a serial re-plating experiment. In line with their findings obtained with Ltbr$^{-/-}$ LSKs, colony formation capacities of Light$^{-/-}$ LSKs were gradually lost in serial re-plating experiments in vitro (FIG. 2$c$).

Figure 9:
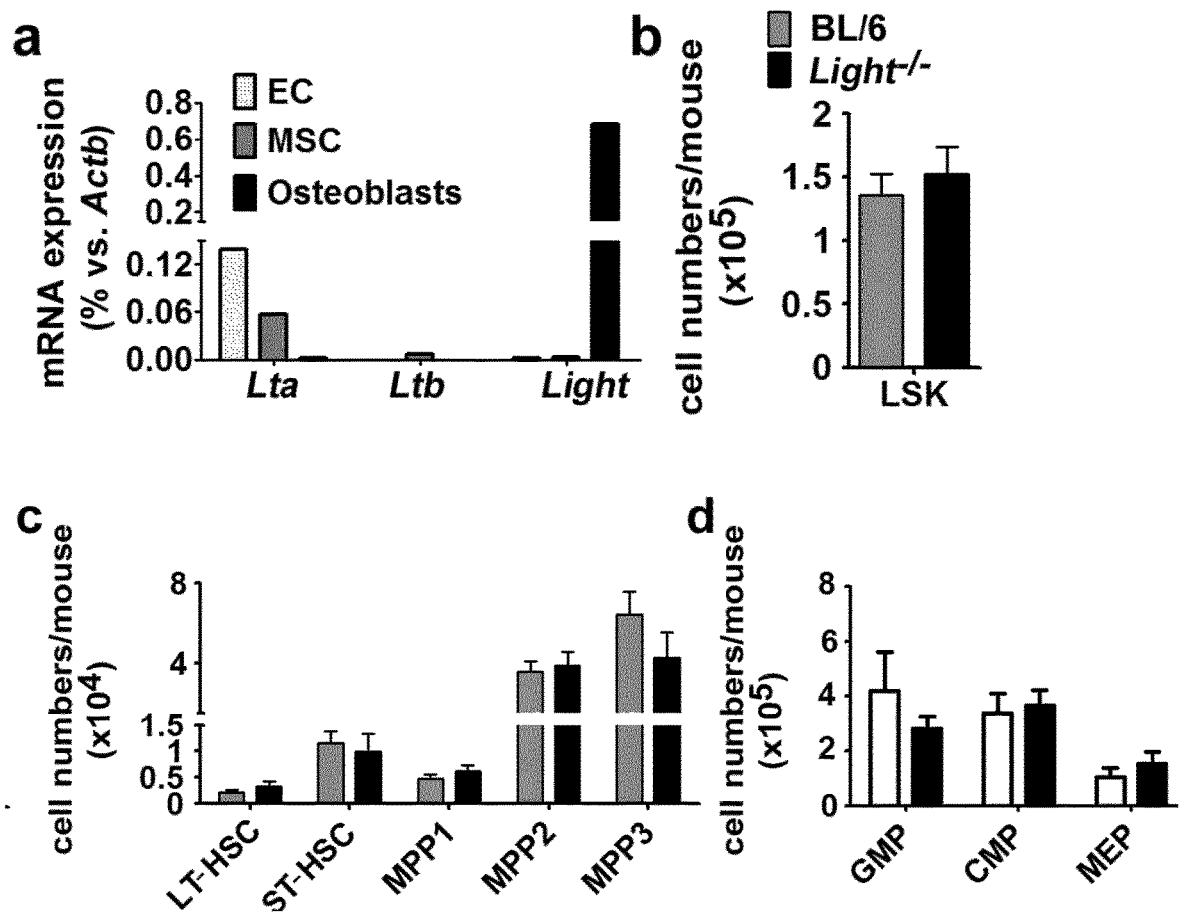
FIG. 9 Autocrine LIGHT expression prevents exhaustion of HSCs. (a) Relative expression of Light, Lta and Ltb of FACS-purified EC; MSC and Osteoblasts from naïve BL/6 mice (cells were pooled from 10 mice). (b-d) Numbers of LSKs (b), LSK subsets (LT-HSC, ST-HSC, MPP1, MPP2, MPP3) (c) and myeloid progenitors (GMP, CMP, MEP) (d) in the BM of naïve BL/6 and $Light^{-/-}$ mice (n=6-7). (e) Numbers of BL/6 and $Light^{-/-}$ leukocytes in blood from Ly5.1/Ly5.2 recipients at the time points indicated post transplantation ($1^{st}$-$4^{th}$). (f) Percentage of BL/6 and $Light^{-/-}$ myeloid progenitors (GMP, CMP, MEP) in the $2^{nd}$, $3^{rd}$ and $4^{th}$ transplantation. Data are shown as mean±SEM of n=7 ($1^{st}$), n=6 ($2^{nd}$), n=3 ($3^{rd}$, $4^{th}$) mice. (g-j) Number of donor leukocytes in blood of Ly5.1/Ly5.2 and congenic Ly5,1/ $Light^{-/-}$ recipients in $1^{st}$ (g), $2^{nd}$ (h), $3^{rd}$ (i) and $4^{th}$ (j) serial transplantation. Data are shown as mean±SEM, Ly5.1/Ly5.2 recipients: n=7 ($1^{st}$), n=5 ($2^{nd}$), n=3 ($3^{rd}$); n=3 ($4^{th}$) Ly5.1/ $Light^{-/-}$ recipients: n=5 ($1^{st}$), n=5 ($2^{nd}$), n=3 ($3^{rd}$), n=3 ($4^{th}$). Statistics: *P<0.05, P<0.01, *P<0.001, ****P<0.0001 (two-tailed t-test).
Figure 9:
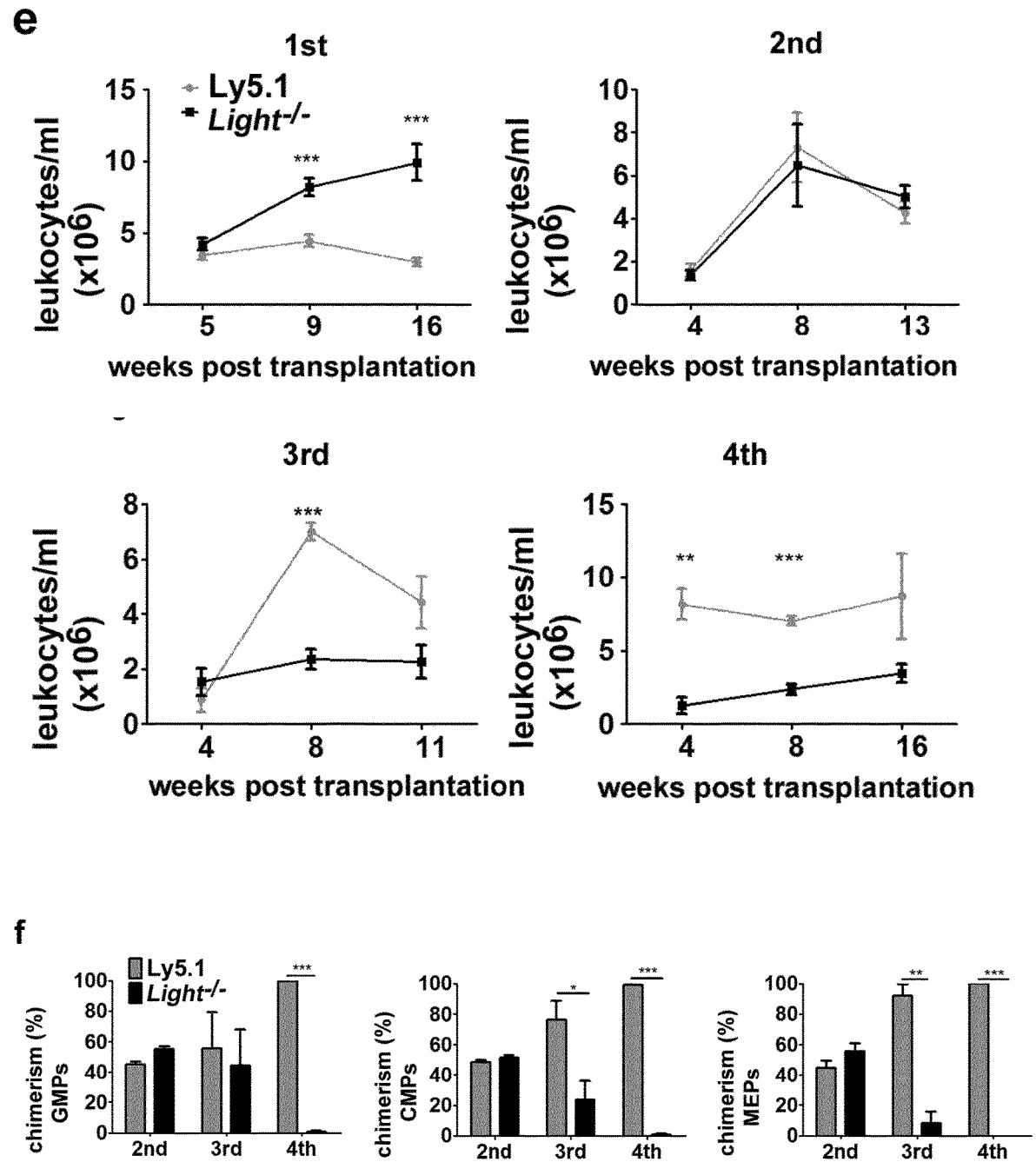
Figure 9:
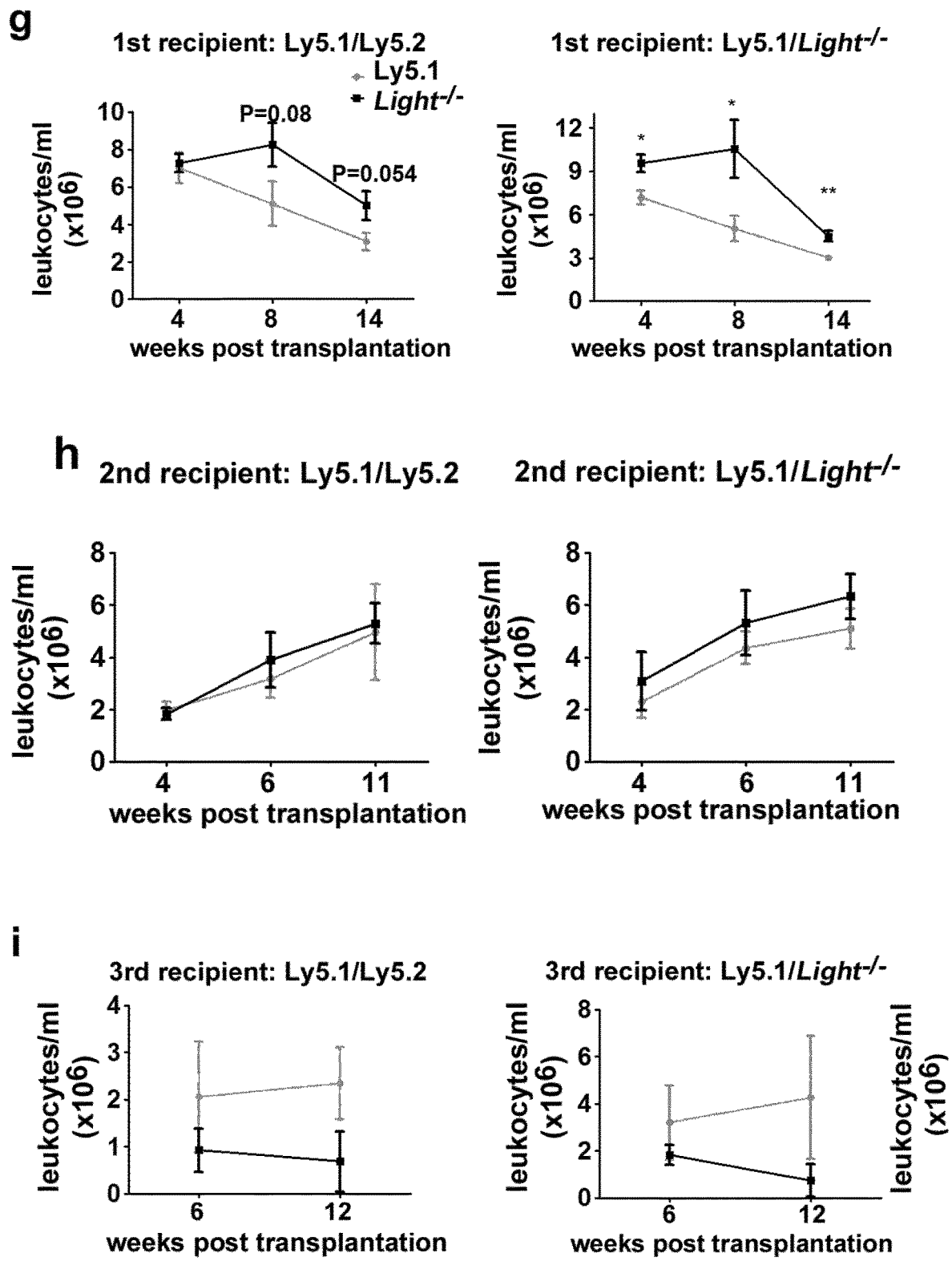
Figure 9:
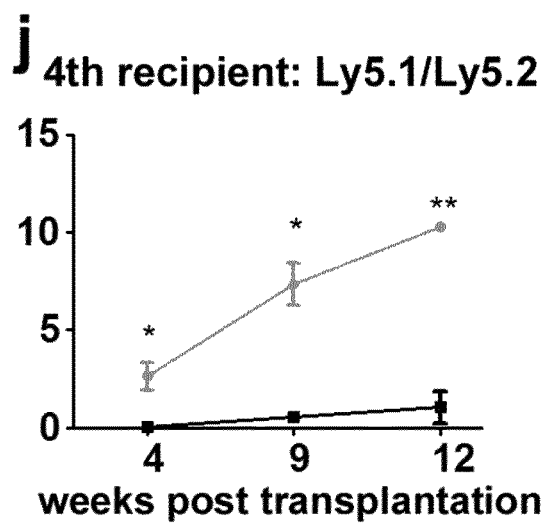
Figure 9:
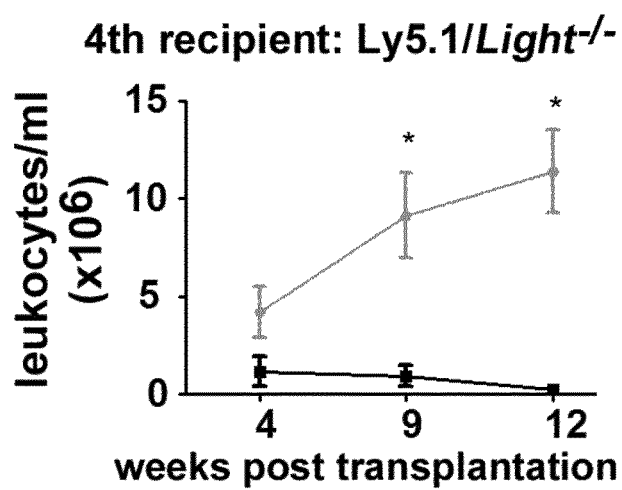
Figure 10:
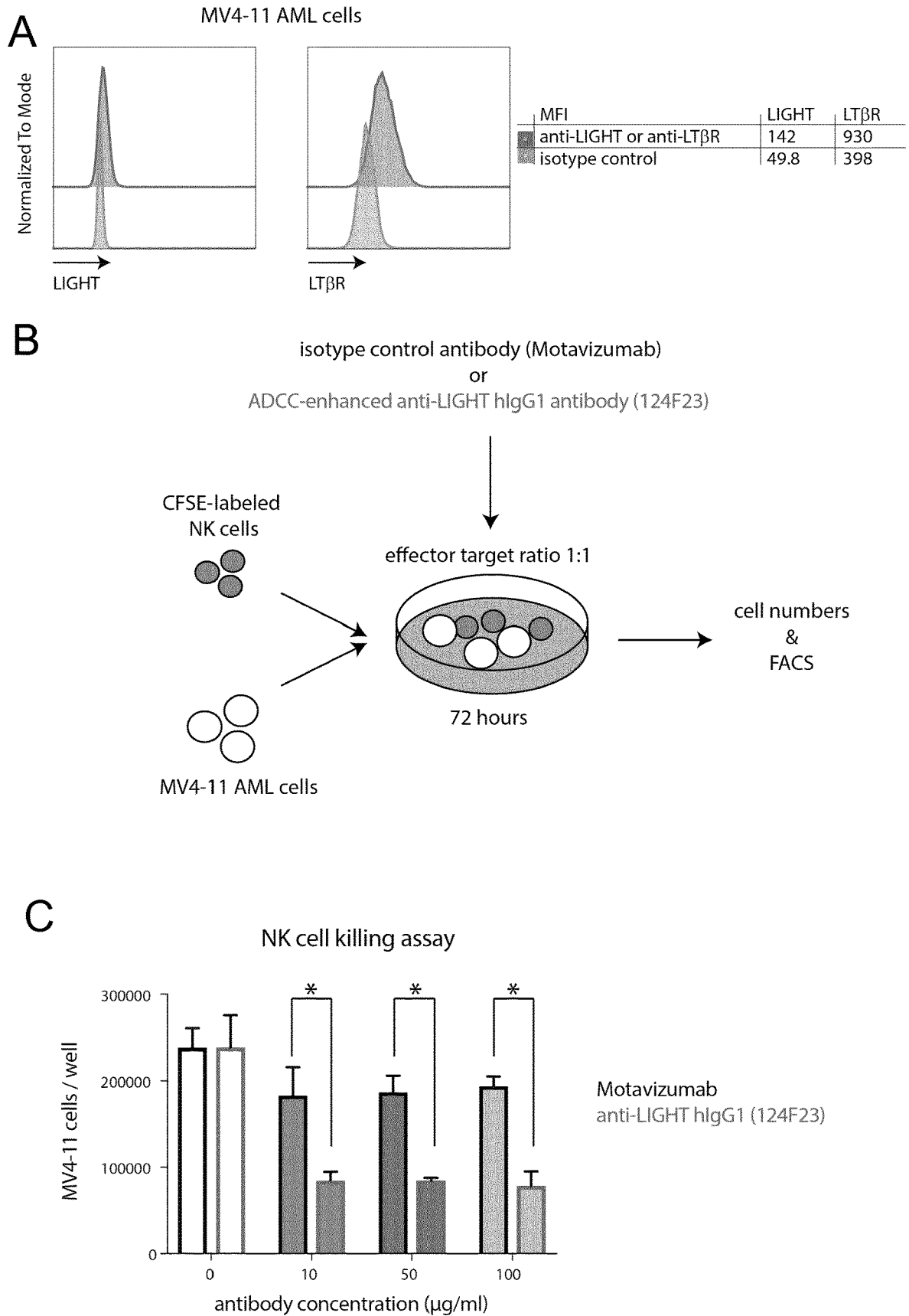
FIG. 10 The ADCC-enhanced anti-LIGHT hIgG1 antibody (clone: 124F23) eliminates MV4-11 AML cell in vitro. (A) Expression of the TNF receptor family member LTβR and its ligand LIGHT on MV4-11 AML cells. Isotype staining is depicted in grey; LIGHT and LTβR staining in red. (B) Experimental setup. $10^5$ CFSE-labeled MV4-11 AML cells were treated with the humanized control monoclonal antibody Motavizumab or a humanized ADCC-enhanced anti-LIGHT hIgG1 monoclonal antibody (clone: 124F23) at titrated concentrations in the presence of allogenic NK cells (ratio 1:1) in triplicates. MV4-11 AML cell numbers per well were counted after 72 hours, the degree of viable cells was determined by Annexin V staining. (C) MV4-11 AML cells per well after 72 h of culture. Data are represented as Data are represented as mean±S.D. Statistics: Student's t-test*, P<0.05.

These data indicate that LIGHT expressed by LSKs triggers LTβR in a cell-autonomous fashion and regulates colony formation in vitro. To study the self-renewal capacity of Light$^{-/-}$ LSKs in vivo, the inventors performed competitive serial repopulation experiments (FIG. 2$d$). Light$^{-/-}$ LSKs reconstituted primary recipient mice more efficiently, resulting in a chimerism of approximately 70% of Lin$^-$ BM cells and higher numbers of leukocytes in blood (FIG. 2$e$, FIG. 9$e$). However, Light$^{-/-}$ LSKs subsequently lost the capacity to reconstitute hematopoiesis in serial transplantations, resulting in less than 10% Light$^{-/-}$ HSPCs and differentiated leukocytes in the 4$^{th}$ transplantation (FIG. 2$e$-$i$, FIG. 9$e$).

The in vitro re-plating experiments suggest that autocrine LIGHT/LTβR signaling maintains LSK self-renewal. However, Light mRNA was also expressed on osteoblasts. Therefore, the inventors analyzed whether LIGHT-expressing cells of the BM microenvironment contribute to LTβR signaling in HSCs by transplanting Ly5.1 or Light$^{-/-}$ (Ly5.2+) LSKs into Ly5.1/Ly5.2 recipients (FIG. 2$j$). This experiment revealed that the lack of LIGHT expression on host cells did not alter the reconstitution potential and self-renewal capacity of Ly5.1 HSPCs in serial re-transplantation experiments in vivo. In contrast, Light$^{-/-}$ LSKs reconstituted hematopoiesis more efficiently in 1$^{st}$ transplantation and then gradually lost the capacity to reconstitute hematopoiesis in 2$^{nd}$, 3$^{rd}$ and 4$^{th}$ transplantations, independently of the expression of LIGHT in recipient mice (FIG. 2$k$-$n$). This indicates that LIGHT ligates LTβR in an autocrine fashion in vivo leading to long-term HSC self-renewal.

Example 3

Figure 3:
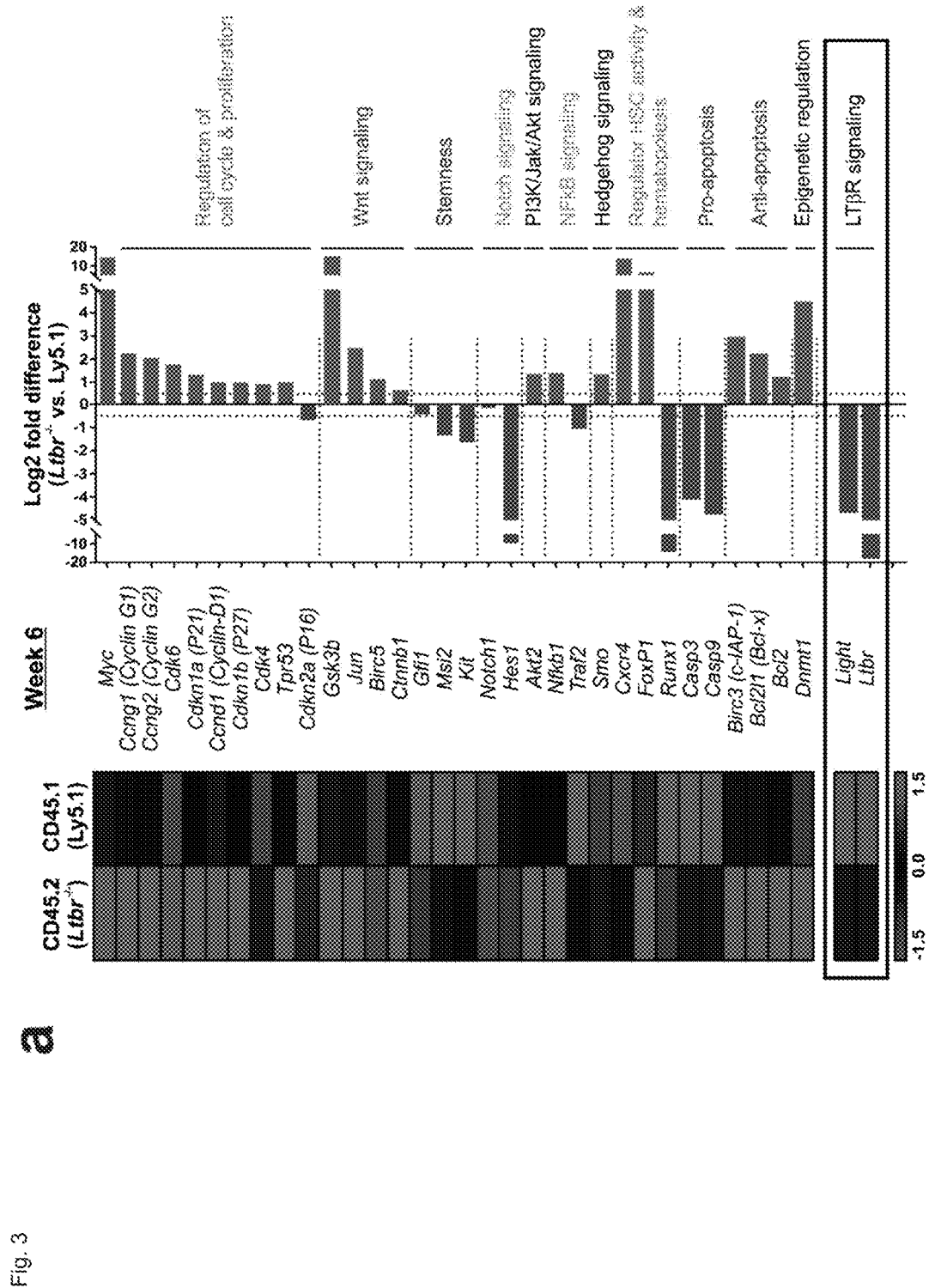
FIG. 3 Loss of LTβR leads to a higher expression of genes related to cell cycling and survival while reducing the expression of genes defining stemness. (a) Heat map of differentially expressed genes in FACS-sorted Ltbr$^{-/-}$ LSKs compared to Ly5.1 LSKs from chimeras six weeks after primary transplantation (gene expression log 2 fold differences Ltbr$^{-/-}$ vs Ly5.1 LSKs;
 n=4). (b) In silico gene network and canonical pathway analysis of the differentially expressed genes; colors of the circles are corresponding to pathways highlighted in part A. (c) Gene ontology (GO) enrichment analysis of the biological pathways regulated by LTbR expressed on LSKs.
Figure 3:
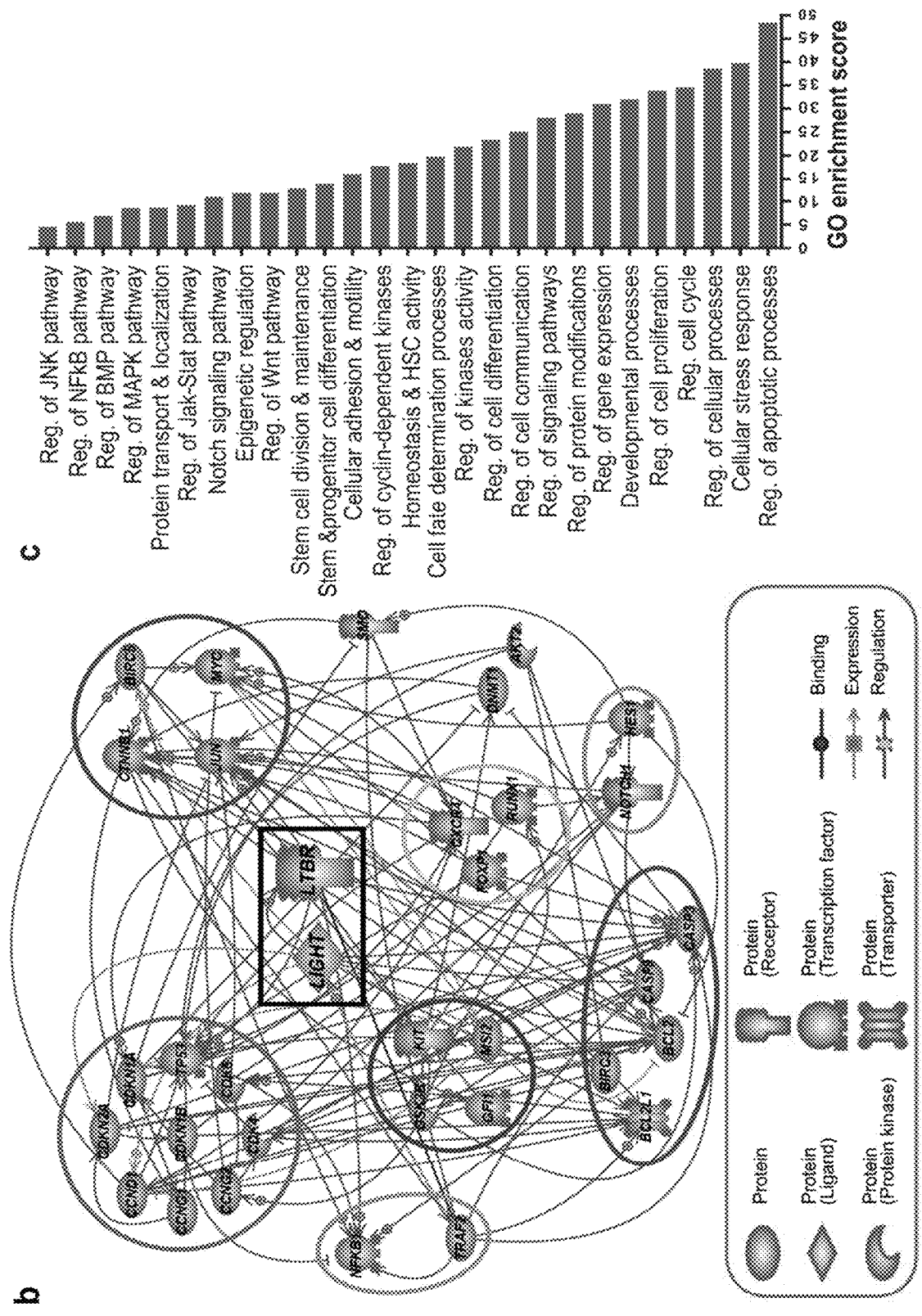

In order to study the molecular mechanisms of LTβR-mediated HSC regulation, the inventors performed a gene expression analysis of 93 pre-defined genes involved in the regulation of stem cell function, differentiation and hematopoiesis. Thirty-four genes were differentially expressed between FACS-purified Ly5.1 and Ltbr$^{-/-}$ LSKs 6 weeks post-transplantation (FIG. 3$a$). Gene expression analysis revealed an up-regulation of genes involved in the cell cycle regulation, such as Myc or Cond1 in the absence of LTβR signaling. In contrast, stemness-related genes, such as RNA binding protein Musashi 2 (Msi2), Kit and Growth Factor Independent 1 Transcriptional Repressor (Gfi1) were significantly down-regulated (FIG. 3$a$). In addition, the expression of Glycogen synthase kinase-3 (Gsk3b), an important negative regulator of Wnt signaling activity increased substantially in the absence of LTβR.

LIGHT-induced LTβR signaling promotes apoptosis. In accordance with these findings, Ltbr-deficient LSKs expressed pro-apoptotic genes at lower levels and anti-apoptotic genes at higher levels compared to Ly5.1 LSKs (FIG. 3$a$).

In order to determine the possible interactions between the 34 differentially expressed genes in Ly5.1 and Ltbr$^{-/-}$ LSKs, the inventors performed in silico network and canonical pathway analysis. This network analysis confirmed that LTβR directly and indirectly regulates cell cycle, proliferation, apoptosis, and stemness-related pathways (e.g. Wnt, NFκB, regulators of HSC activity and hematopoiesis) (FIG. 3$b$; indicated by colour circles). Importantly, the results obtained in the network analysis were further confirmed by gene ontology (GO) enrichment analysis (FIG. 3$c$).

Example 4

Figure 4:
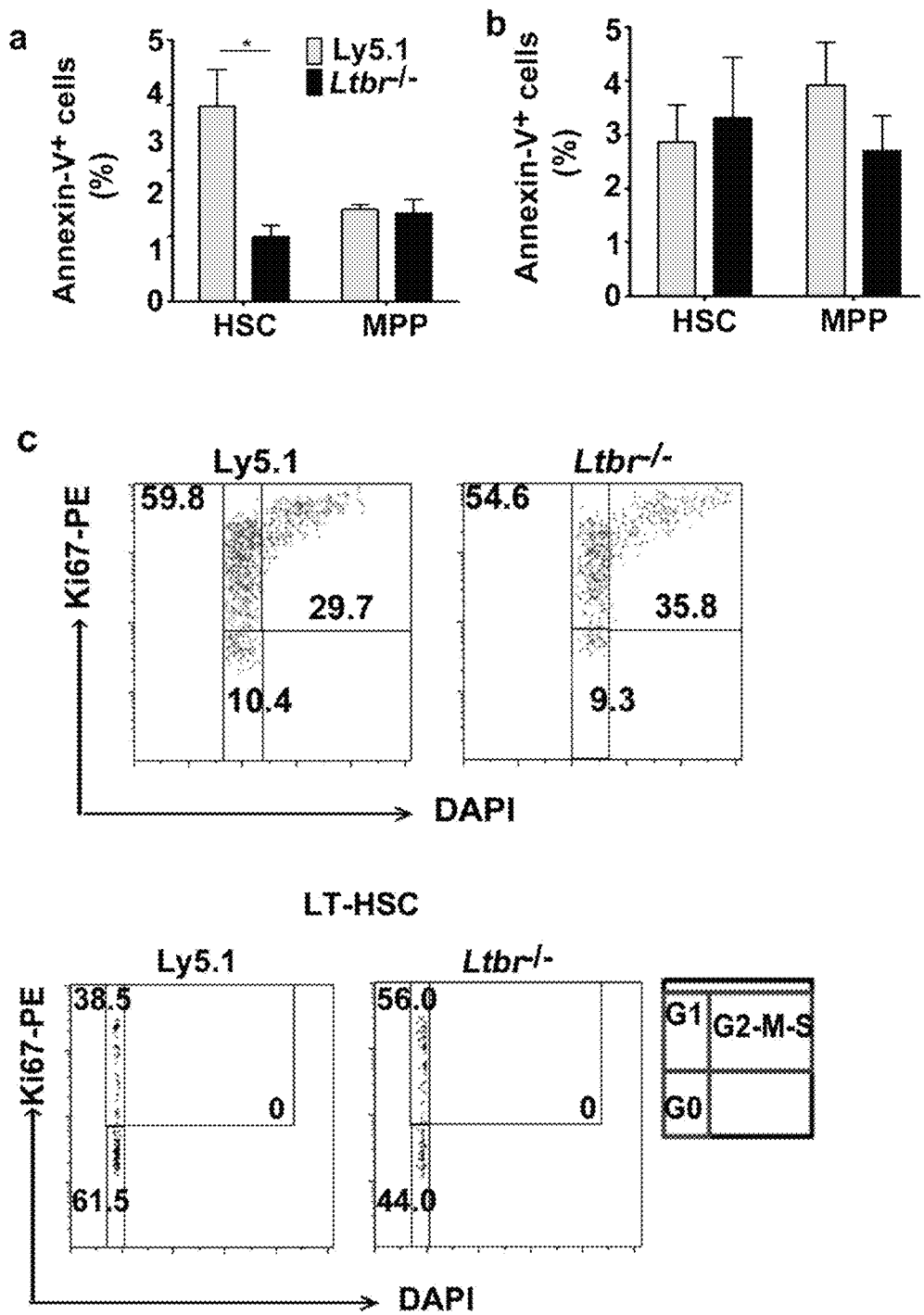
FIG. 4 Ltbr-deficiency induces proliferation and differentiation of HSCs. (a,b) Frequency of Annexin V$^+$ HSCs and MPPs 6 (a) and 12 (b) weeks after 1$^{st}$ transplantation. One out of two independent experiments is shown, n=3-6 mice (c) Representative dot plot of the cell cycle analysis by Ki67 and DAPI staining of Ly5.1 and Ltbr-BM LSKs and LT-HSCs 12 weeks after primary transplantation. Numbers in plots are shown as percentages of cells in each cell cycle phase. (d) Frequency of Ly5.1 and Ltbr$^{-/-}$ LSKs, LT-HSCs, ST-HSCs and total MPPs (LSK; CD48$^+$) in different cell cycle phases 12 weeks post-transplantation. Data are representative of two independent experiments (n=4-5). (e) Frequency of Ly5.1 and Light$^{-/-}$ LSKs, LT-HSCs, ST-HSCs and total MPPs (CD48$^+$) in different cell cycle status 12 weeks post-transplantation. LSKs were isolated from 2-3 chimeric mice and pooled for the analysis. Pooled data from two independent experiments are shown. (f) Left: representative picture of Numb distribution in dividing Ly5.1 and Ltbr$^{-/-}$ FACS-sorted LSKs 12 weeks after transplantation. Cells were analyzed by ImageStream®$^X$, Nuclei were counterstained with DAPI. Right: quantification of donor Ly5.1 (27 cells) and Ltbr'-LSKs (48 cells) in symmetric (SD) or asymmetric cell division (AD). Statistics: *P<0.05, P<0.01, *P<0.001, ****P<0.0001 (two-tailed t-test).
Figure 4:
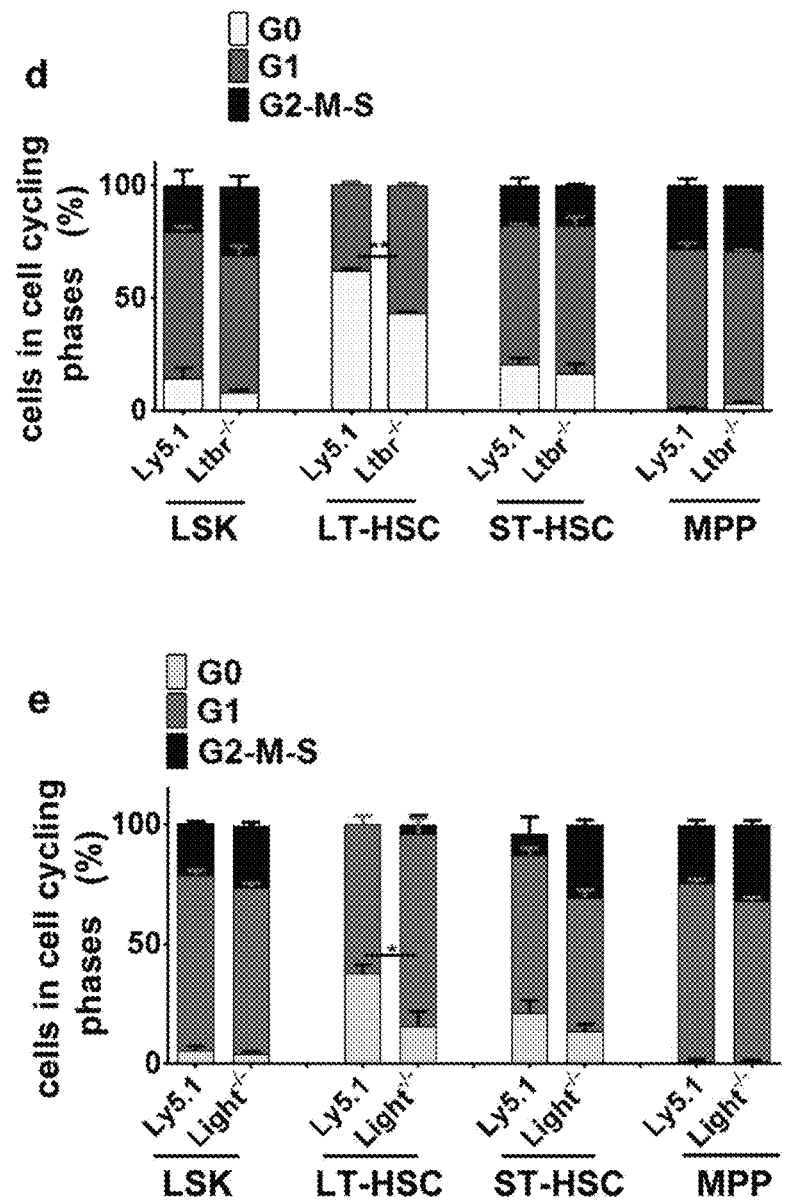
Figure 4:
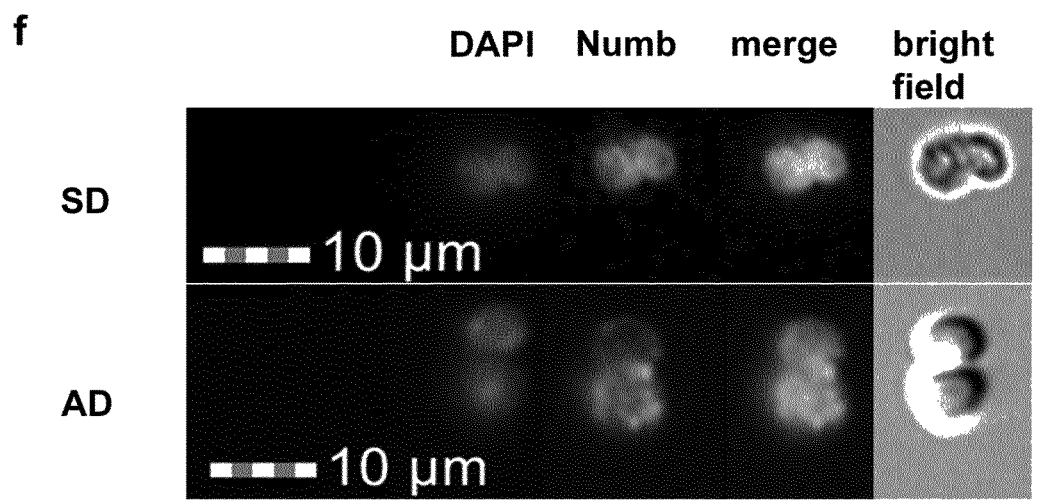
Figure 4:
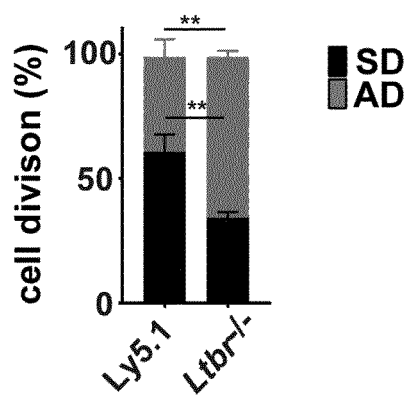

The inventors next sought to functionally analyze the mechanisms by which LTβR signaling regulates HSC function. To this end, the inventors analyzed cell viability, cell cycle activity and cell division of Ly5.1 and Ltbr$^{-/-}$ HSCs in chimeric mice. Fewer Ltbr$^{-/-}$ HSCs but not MPPs underwent apoptosis when compared to LTβR-proficient control cells 6 weeks after transplantation (FIG. 4$a$). However, this difference disappeared 12 weeks after transplantation (FIG. 4$b$).

The reconstitution of hematopoiesis in secondary recipient mice requires that LT-HSCs enter active cell cycle and expand in numbers by approximately a factor of 10. To examine cell cycle activity, the inventors FACS-sorted Ly5.1 and Ltbr$^{-/-}$ LSKs, and stained the LSK subsets with Ki67 and DAPI. Ltbr-deficiency did not affect cell cycle activity in total LSKs. However, analysis of LSK subpopulations revealed that cell cycle activity in LT-HSCs but not in ST-HSCs and MPPs was increased in the absence of LTβR signaling (FIG. 4c, d). This indicates that LTβR signaling suppresses cell cycle activity in the most primitive HSC subset, the LT-HSCs. Similarly, Light-deficient LT-HSCs proliferated more in a similar experimental setup. However, Light-deficient ST-HSCs and MPPs also had an increased cell cycle activity compared to Light-competent controls (FIG. 4e). Taken together, these experiments indicate that LIGHT/LTβR signaling maintains quiescence in primitive HSCs.

Re-entry of HSCs into cell cycle comprises the control between asymmetric and symmetric division that governs differentiation and maintenance of the stem cell pool. To assess whether LTβR signaling regulates the cell fate decision of HSPCs, the inventors quantified asymmetric and symmetric cell divisions of Ly5.1 and Ltbr$^{-/-}$ LSKs by analyzing the distribution of the cell fate determinant Numb in daughter cells. Absence of LTβR signaling in LSKs promoted asymmetric over symmetric cell division (FIG. 4f). This indicates that LIGHT/LTβR signaling in HSCs maintains self-renewal by regulating cell proliferation and asymmetric versus symmetric cell division.

Example 5

Figure 5:
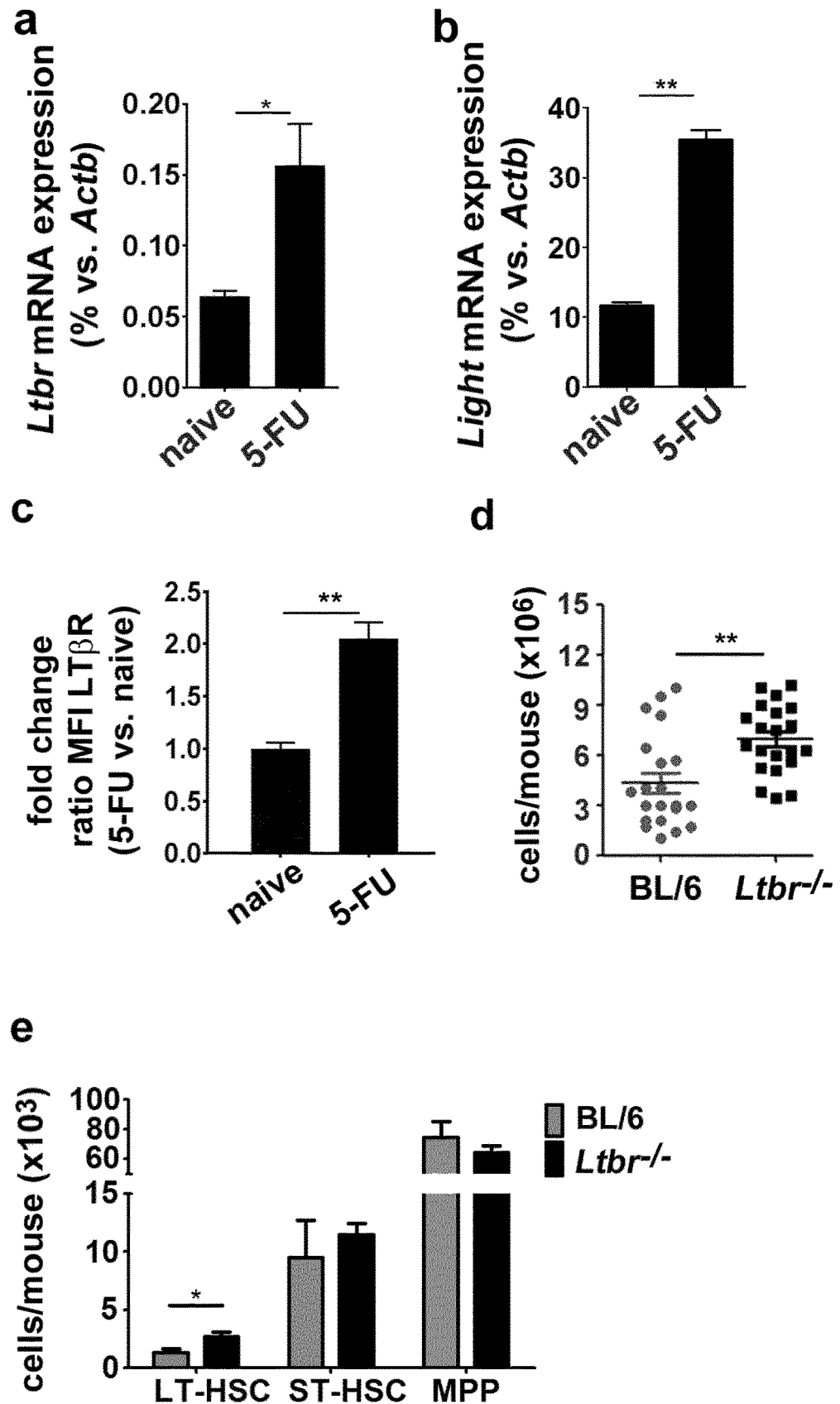
FIG. 5 Treatment of Ltbr$^{-/-}$ mice with 5-FU leads to increased HSC cell cycle activity and reduced long-term repopulation. (a,b) Quantitative RT-PCR analysis of Ltbr$^{-/-}$ (a) and Light (b) in FACS-sorted BM LSKs from naïve and 5-FU treated BL/6 mice 8 days after treatment (n=4 mice). (c) Ratio of LTβR MFI on HSCs from 5-FU treated BL/6 vs. naïve BL/6 mice. Statistics: **P<0.01, n=4. (d) Total BM cell numbers of BL/6 and Ltbr$^{-/-}$ mice 8 days post 5-FU injection (n=20-21). (e) Total numbers of BM LSK subpopulations in 5-FU treated BL/6 and Ltbr$^{-/-}$ mice, n=3. (f) Left: representative FACS profiles of cell cycle analysis of BM LSKs. Right: Percentage of BL/6 and Ltbr$^{-/-}$ LSK in each cell cycle phase. Data represent 1 of 2 independent experiments; LSKs were pooled for analysis from 3-5 mice. (g) Percentages of FACS-sorted LSKs from 5-FU treated BL/6 and Ltbr$^{-/-}$ mice in symmetric (SD) or asymmetric division (AD). Data represent 1 of 2 independent experiments, with LSK numbers n=73 (BL/6) and n=85 (Ltbr$^{-/-}$). (h) Fold change of CFU capacity of FACS-sorted BL/6 and Ltbr$^{-/-}$ and LSKs in serial re-plating experiments, pooled data from two independent experiments are shown, n=6 mice. (i) Experimental design of BM reconstitution after 5-FU treatment. (j) Percentages of Ly5.1 and Ltbr$^{-/-}$ BM donor cells of recipients 6 weeks post-transplantation, 1 of 2 independent experiments (n=10). Unless otherwise stated, data are presented as mean±SEM, *P<0.05, P<0.01, *P<0.001, (two-tailed t-test).
Figure 5:
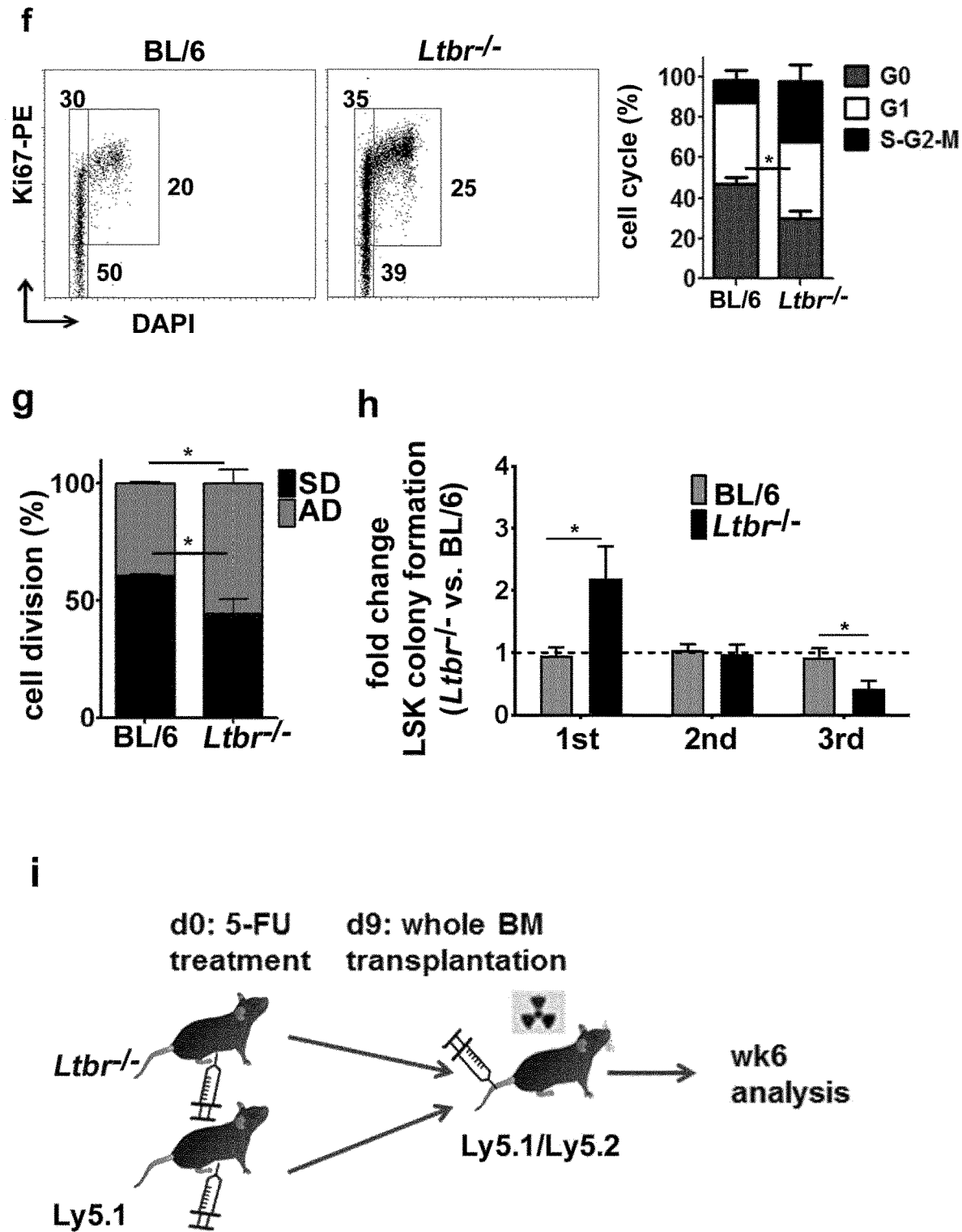
Figure 5:
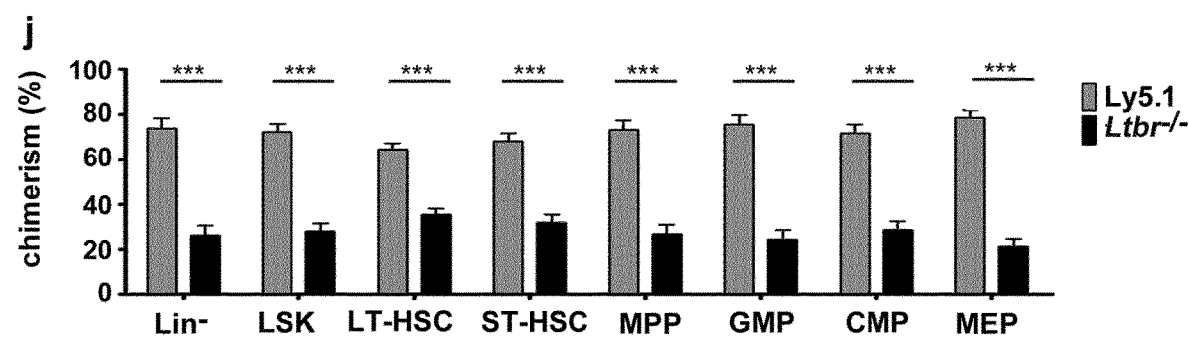

Genotoxic drugs or irradiation leads to the damage and eradication of hematopoietic cells and results in the activation of a demand-adapted hematopoiesis in order to replenish the hematopoietic system. To test hematopoietic reconstitution after genotoxic stress, the inventors treated BL/6 and Ltbr$^{-/-}$ mice with the cytotoxic agent 5-Fluorouracil (5-FU). Since treatment with 5-FU leads to the down-regulation of c-kit, LSKs were defined as Lin$^-$ sca-1$^+$ cells and all HSC subsets were defined without c-kit staining. Similar to the transfer of LSKs into irradiated recipient mice (FIG. 2a, b) 5-FU treatment resulted in increased Ltbr and Light mRNA expression and LTβR protein expression in LSKs (FIG. 5a-c). Interestingly, total BM cellularity was significantly higher in Ltbr$^{-/-}$ compared to BL/6 mice eight days after 5-FU treatment (FIG. 5d). In addition, numbers of LT-HSC were significantly increased in Ltbr$^{-/-}$ compared to BL/6 mice, whereas the numbers of ST-HSCs and MPPs remained unchanged (FIG. 5e). In accordance with the reduced apoptosis of Ltbr$^{-/-}$ HSCs in chimeric mice (FIG. 4a), significant fewer Ltbr$^{-/-}$ HSCs and MPPs stained Annexin-V$^+$ compared to controls. In addition, significantly fewer Ltbr$^{-/-}$ LSKs were found in the G0 phase of the cell cycle compared to BL/6 LSKs (FIG. 5f). Moreover, Ltbr-deficiency resulted in an increase in asymmetric over symmetric cell division (FIG. 5g). LSKs from Ltbr$^{-/-}$ mice initially formed more colonies eight days after 5-FU treatment, while colony formation was consecutively lost in serial re-platings (FIG. 5h).

To study the number and function of HSCs after 5-FU treatment in vivo, the inventors transplanted BM cells from 5-FU treated Ly5.1 and Ltbr$^{-/-}$ donors into lethally irradiated Ly5.1/Ly5.2 mice (FIG. 5i). Ltbr$^{-/-}$ donor BM cells reconstituted recipient mice less efficient than control BM cells, resulting in a significantly reduced frequency of Lin$^-$ cells and HSPCs (FIG. 5j). These findings suggest that the frequency of HSCs capable to reconstitute recipient mice is significantly lower in 5-FU treated Ltbr$^{-/-}$ mice than in controls. Together, these data indicate that LTβR signaling reduces cell proliferation and asymmetric cell division and thereby maintains the pool of HSCs in response to genotoxic stress.

Example 6

Figure 6:
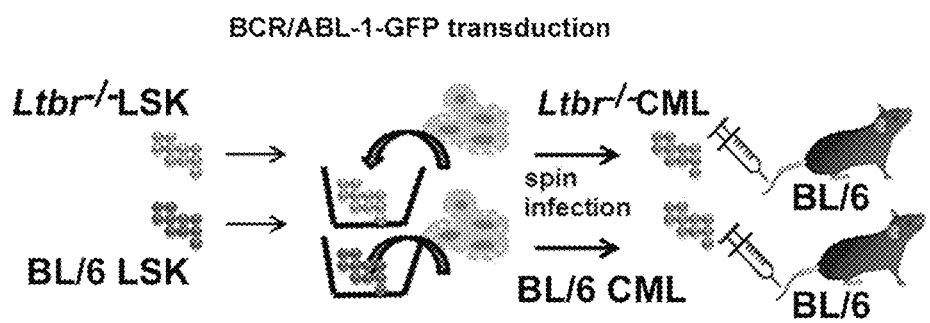
FIG. 6 LTβR expression of LSCs promotes CML progression. (a) Schematic for BL/6 and Ltbr-CML induction, analysis was performed 19 days later. (b) Relative Ltbr mRNA expression in FACS-sorted naïve BL/6 LSKs and LSCs (Lin$^-$ GFP$^+$ c-kit$^+$ sca1$^+$, n=3). (c) LTβR expression on BL/6 LSCs. (d) Relative Light mRNA expression of FACS-sorted naïve BL/6 LSKs and BL/6 LSCs (n=3). (e) BCR/ABL-1-GFP$^+$ granulocytes/µl in blood from BL/6 and Ltbr$^{-/-}$ CML mice. One of 2 independent experiments is shown (BL/6 CML: n=4-10, Ltbr$^{-/-}$ CML: n=6-10). (f) Kaplan-Meier survival curves of BL/6 and Ltbr$^{-/-}$ CML mice (BL/6 CML: n=10; Ltbr$^{-/-}$ CML: n=9; dashed line: pre-determined end-point of the experiment. (g) Spleen weight of BL/6 CML and Ltbr$^{-/-}$ CML mice (BL/6 CML n=4; Ltbr$^{-/-}$ CML n=7). (h-j) LSC (h), LT-LSC, ST-LSC (i) and leukemic multipotent progenitor (j) cell numbers in BM of BL/6 and Ltbr$^{-/-}$ mice. Data are shown as 1 of 2 independent experiments (BL/6 CML: n=4-10, Ltbr$^{-/-}$ CML: n=6-10). (k) Schematic of secondary CML transplantation with BM cells or LSCs. (l,m) Kaplan-Meier survival curves of recipient mice of whole CML BM cells (l, n=4-7) and FACS-sorted LSCs (m, n=7-8). (n) Percentage of LT-HSC, ST-HSC and MPPs in different cell cycle phases from BL/6 and Ltbr$^{-/-}$ mice. Data are pooled from two independent experiments (n=6). (o) Percentages of FACS-sorted BL/6 and Ltbr$^{-/-}$ LSCs in symmetric (SD) or asymmetric division (AD), analyzed LSCs: 140 (BL/6); 230 (Ltbr$^{-/-}$). (p) BCR/ABL-1-GFP$^+$ granulocytes/µl in blood from BL/6 and Light$^{-/-}$ CML mice. One out of two independent experiments is shown (BL/6 CML: n=3-4, Light-/- CML: n=3-4). (q) Spleen weight of BL/6 CML and Light-CML mice (BL/6 CML n=3-4; Light-/- CML n=3-4) nineteen days post transplantation. (r-t) LSC (r), LT-LSC, ST-LSC (s) and leukemic MPP (t) cell numbers in BM of BL/6 and Light$^{-/-}$ mice. Statistics: *P<0.05, P<0.01, *P<0.001, ****P<0.0001 (two-tailed t-test: b, d, e, g, h-j, n, o, p, r-u), log-rank test (f,l,m,q).
Figure 6:
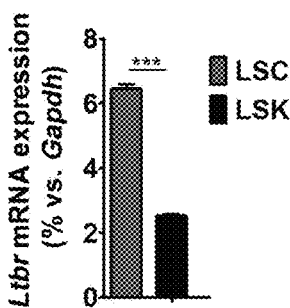
Figure 6:
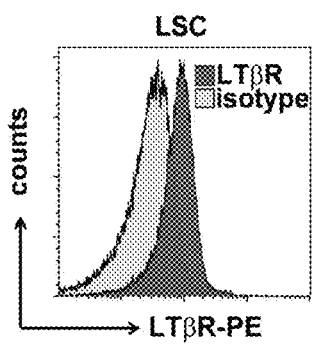
Figure 6:
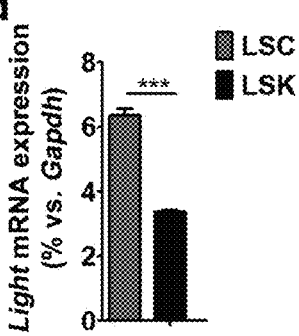
Figure 6:
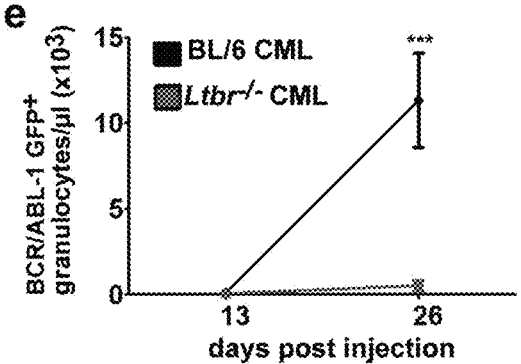
Figure 6:
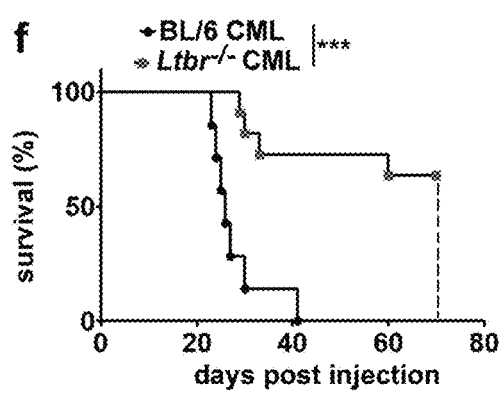
Figure 6:
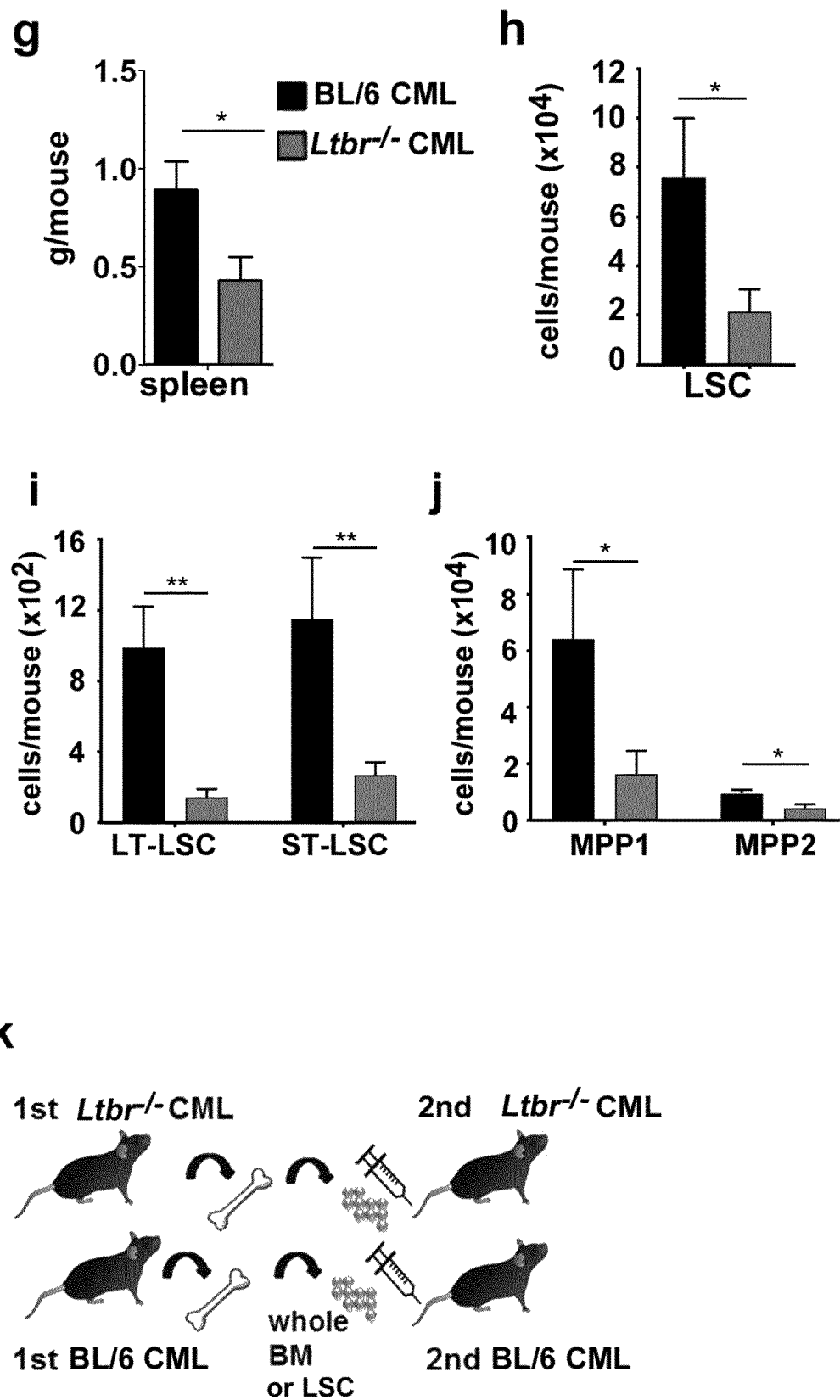
Figure 6:
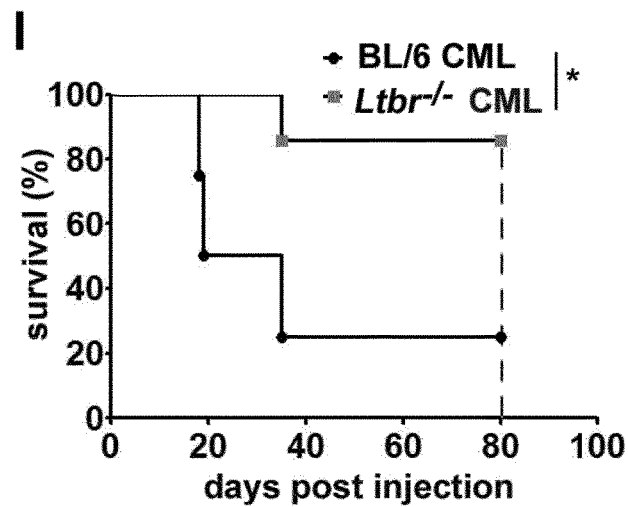
Figure 6:
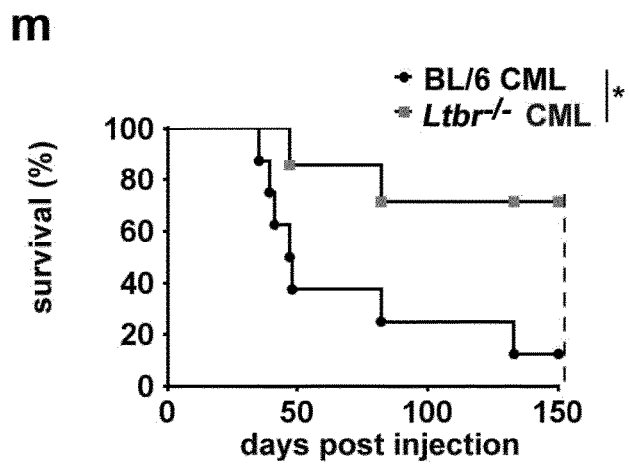
Figure 6:
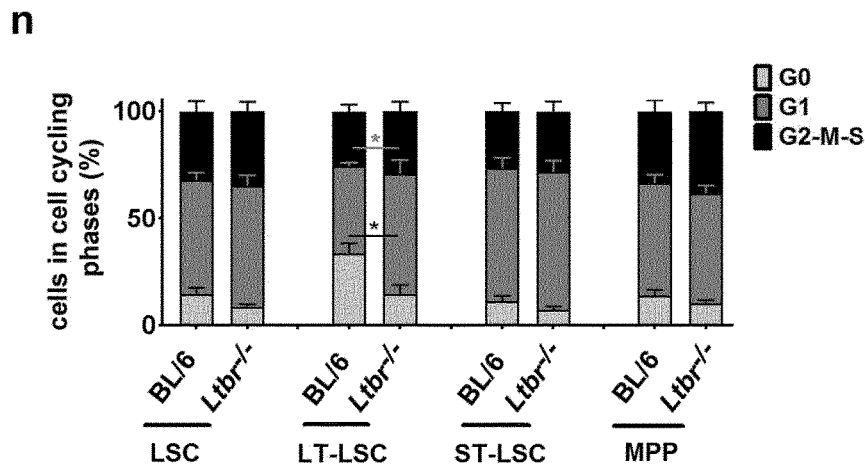
Figure 6:
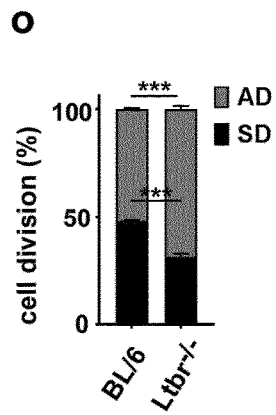
Figure 6:
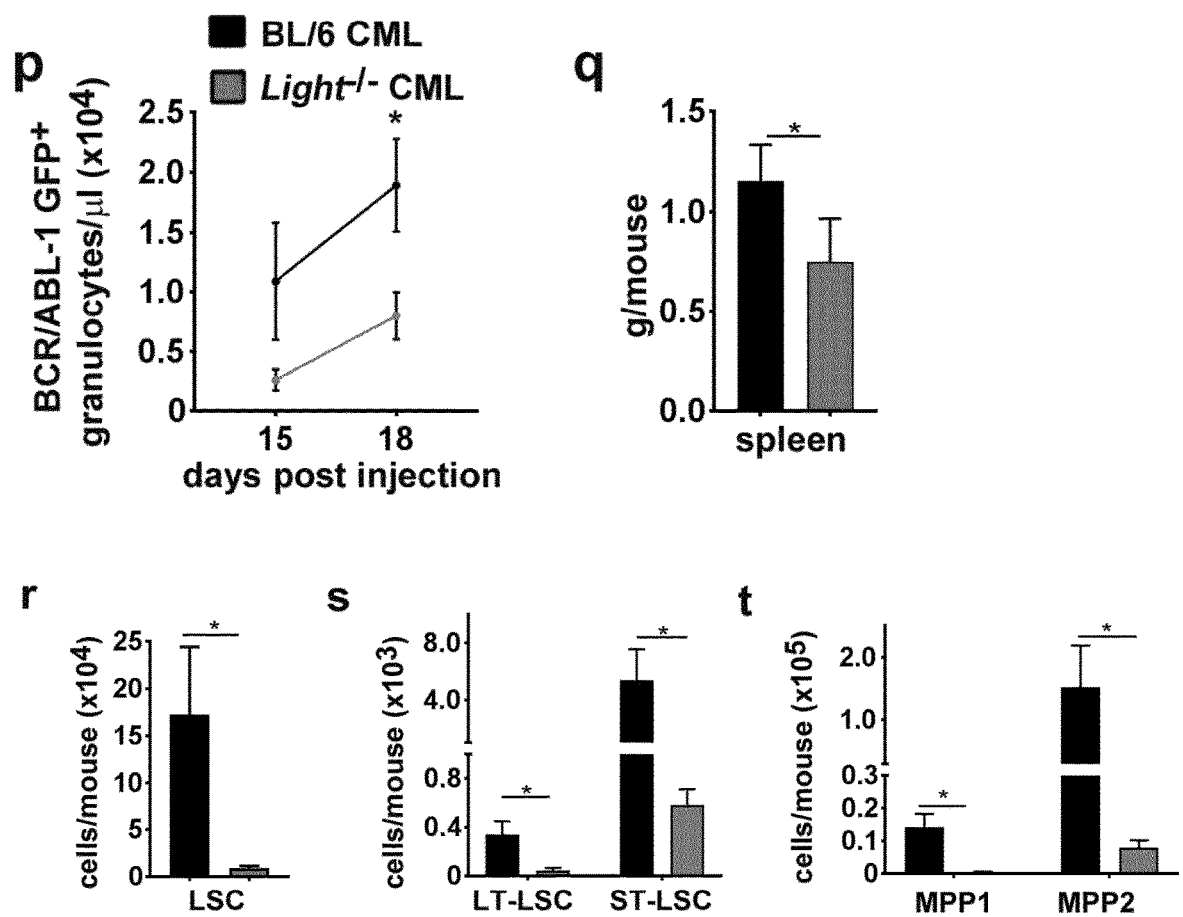

So far, the presented data indicated that LTβR signaling regulates HSC cell cycling and self-renewal. Since self-renewal and regulation of cell fate in LSCs is crucial for the development of the disease, the inventors studied LTβR signaling in a murine CML model. CML-like disease was induced by injection of BCR-ABL1-GFP transduced BL/6 or Ltbr$^{-/-}$ LSKs into non-irradiated BL/6 recipients (FIG. 6a). In this model, LSCs are characterized as GFP$^+$Lin$^-$sca-1$^+$c-kit$^+$ and LSC subsets are defined in analogy to normal HSC subpopulations.

LSCs expressed Ltbr mRNA at significant higher levels than normal LSKs (FIG. 6b). FACS analysis revealed that LTβR was expressed on LSCs and all LSC subsets (LT-LSC, ST-LSC and MPPs) as well as on myeloid leukemia progenitors and differentiated granulocytes (FIG. 6c). Similarly, LSCs expressed Light at higher levels than normal LSKs (FIG. 6d). Ltbr$^{-/-}$ CML progressed significantly slower than BL/6 CML with reduced leukemia granulocytes in PB leading to a significantly prolonged survival (FIG. 6e, f). In addition, spleen weights of Ltbr$^{-/-}$ CML mice were significantly reduced compared to BL/6 CML mice 19 days post-transplantation, suggesting a lower leukemia burden (FIG. 6g). Importantly, significantly fewer LSCs (LT- and ST-LSCs) and MPP1 were found in the BM of Ltbr$^{-/-}$ compared to BL/6 CML mice (FIG. 6h,j).

In order to functionally analyze LSCs from BL/6 and Ltbr$^{-/-}$ mice, the inventors transplanted either whole BM or FACS-purified LSCs from primary BL/6 and Ltbr$^{-/-}$ CML mice into non-irradiated BL/6 recipients (FIG. 6k). Recipients of Ltbr$^{-/-}$ CML BM (FIG. 6l) or LSCs (FIG. 6m) survived significantly longer than recipients of BL/6 BM or LSCs. This indicates that Ltbr$^{-/-}$ CML harbors fewer LSCs and that the phenotypically characterized Ltbr$^{-/-}$ LSCs are functionally impaired.

The percentage of Annexin-V$^+$ LSCs and LSC subsets was comparable in BL/6 and Ltbr$^{-/-}$ CML mice, suggesting that LTβR signaling did not significantly affect cell viability. However, lack of LTβR increased cell cycle activity with an approximately 2-fold increase of LT-LSCs in G2-M-S phase compared to BL/6 LT-LSCs. In contrast, cell cycle activity of ST-LSCs or MPPs did not depend on LTβR signaling (FIG. 6n). Moreover, the analysis of the distribution of Numb in dividing LSCs in telophase revealed an increased number of Ltbr$^{-/-}$ LSCs in asymmetric over symmetric cell division (FIG. 6O). Similarly, CML induced by Light−/− BCR-ABL1-GFP LSKs (Light−/− CML) progressed significantly slower than BL/6 CML with reduced numbers of leukemia granulocytes in PB and significantly reduced spleen weights 18 days post-transplantation (FIG. 6p-r). In addition, significantly fewer LSCs (LT- and ST-LSCs) and MPPs (MPP1, MPP2) were found in the BM of Light−/− compared to BL/6 CML mice 18 days post-transplantation (FIG. 6s-u). These data indicate that LIGHT/LTβR signaling regulates cell division and cell fate in LSCs and promotes disease progression.

Example 7

Figure 7:
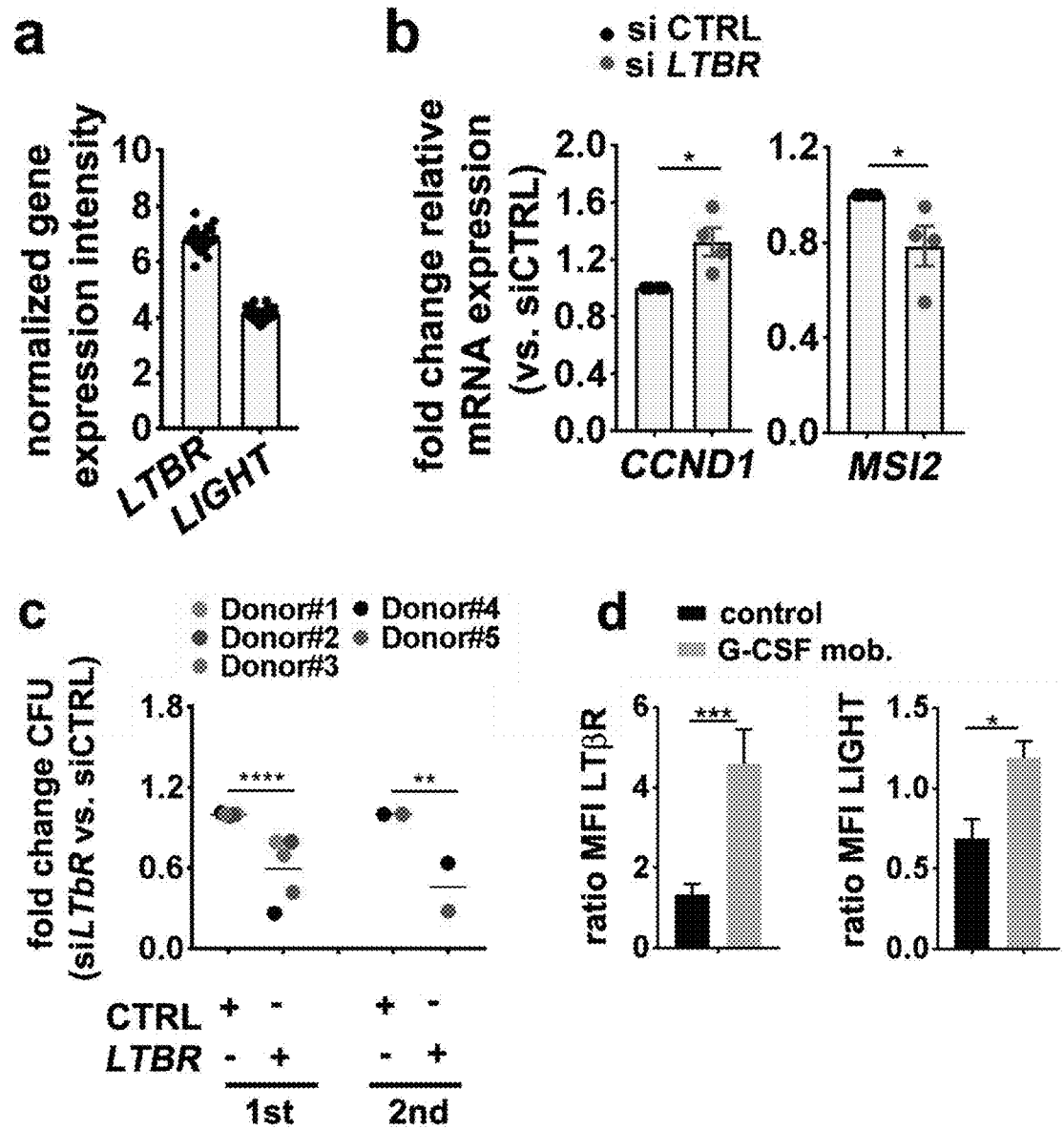
FIG. 7 LTβR signaling in human HSPCs and CML stem cells. (a) mRNA expression intensity of LTβR and LIGHT in CD34+ cells from 27 healthy donors, analyzed in a publicly available microarray dataset (GSE32719). (b) Fold change of relative mRNA expression of indicated genes in FACS-purified HSPCs from human control donors 24 h after transfection with LTBR targeted SIRNA (siLTBR) relative to HSPCs treated with control siRNA (siCTRL), n=4, data were pooled for analysis from three independent experiments. Data are shown as ±SEM. (c) Fold change colony formation (CFU) and re-plating of FACS-purified BM HSPCs from control donors, transfected with siLTBR vs. siCTRL (1st plating: n=5, 2nd plating: n=2, data were pooled for analysis from three independent experiments and shown as grand mean). (d) LTβR and LIGHT ratio MFI in control BM HSPCs (CD45$^{int}$Lin$^-$CD34$^+$) (black) and G-CSF mobilized human PB HSPCs (grey). Bar graph represents mean±SEM of n=7 (control), n=3 G-CSF-treated patients. Data from five independent experiments were pooled for the analysis. (e) Fold change CFU and re-plating of FACS-purified PB HSPCs from G-CSF treated donors, transfected with siLTBR, siLIGHT vs. siCTRL (1st plating: n=2, 2nd plating: n=2, data are pooled for analysis from two independent experiments and shown as grand mean). (f) Heatmap analysis from public available transcriptomic data (GEO: GSE11675). Diagnosed CML (red colors) and healthy donors (blue colors) were analyzed for LTBR, LIGHT and LTB gene expression in PB CD34+ Lin− cells (gene expression log 2 fold differences CML vs Healthy). (g) LTβR and LIGHT ratio MFI in healthy BM HSPCs ($CD45^{int}Lin^-CD34^+$) (black) and BM HSPCs from CML patients (grey). Bar graph represents mean of n=7 (control), n=3 CML patients. Data from five independent experiments were pooled for the analysis. Data are shown as mean±SEM. (h) Fold change CFU and re-plating of FACS-purified HSPCs from CML patients, transfected with siLTBR vs. siCTRL (1st plating: n=4, one sample (Pat 4/5) was used as pooled cells from two CML patients, 2nd plating: n=4, data are pooled for analysis from two independent experiments and shown as grand mean). (i) Fold change of relative mRNA expression of indicated genes in CML HSPCs, 24 h post-transfection with siLTBR relative to mRNA expression in siCTRL treated CML HSPCs (n=4, data are pooled for analysis from two independent experiments, data are presented as mean±SEM, n=2). (j) Fold change CFU and serial re-platings of FACS-purified CML HSPCs from 2 patients, pooled for further transfection with siLIGHT relative to siCTRL in 1st, 2nd and 3rd plating. Statistics: Unless otherwise stated data are presented as mean±SEM, *P<0.05, P<0.01, *P<0.001, ****P<0.0001 (two-tailed t-test).
Figure 7:
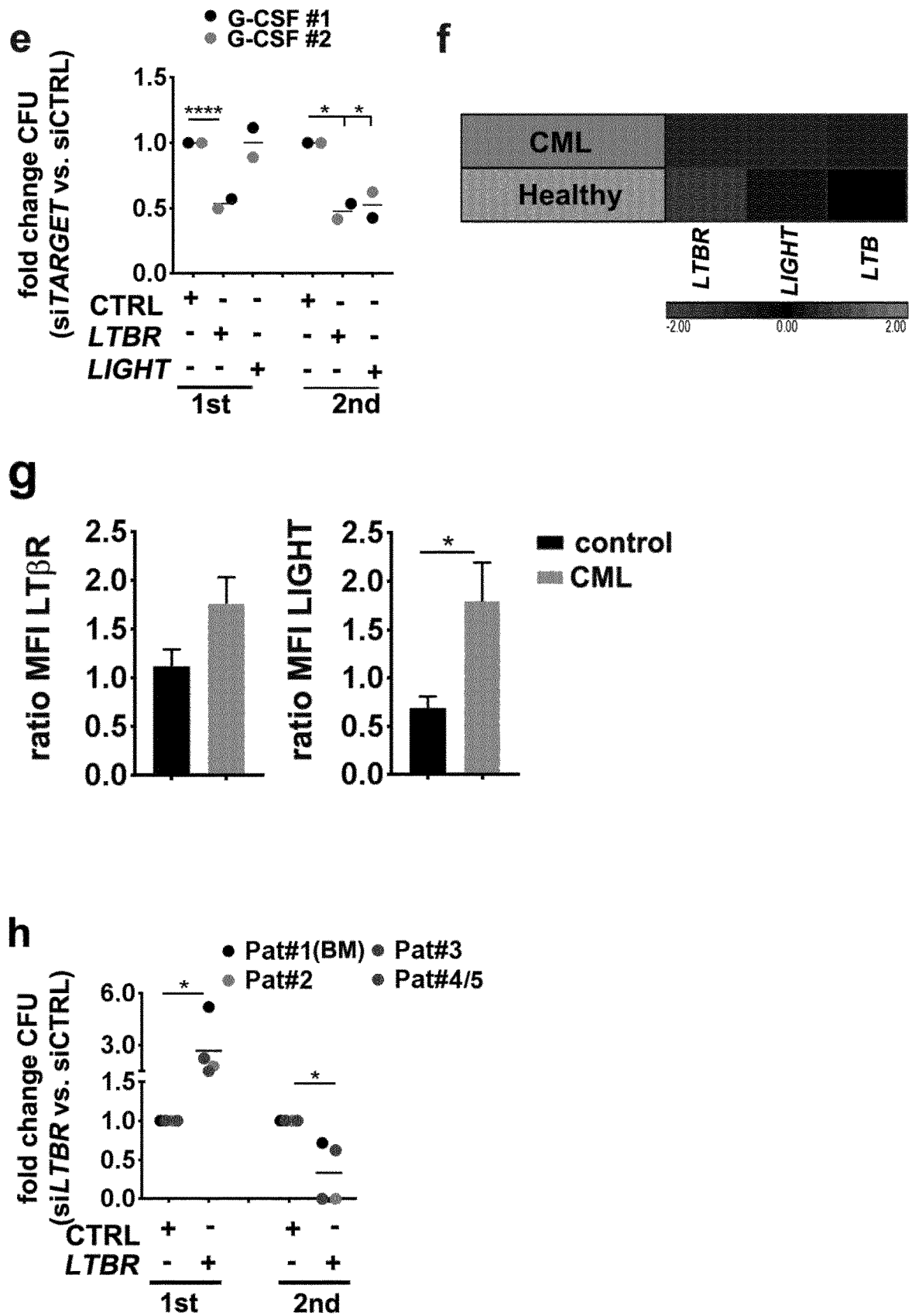
Figure 7:
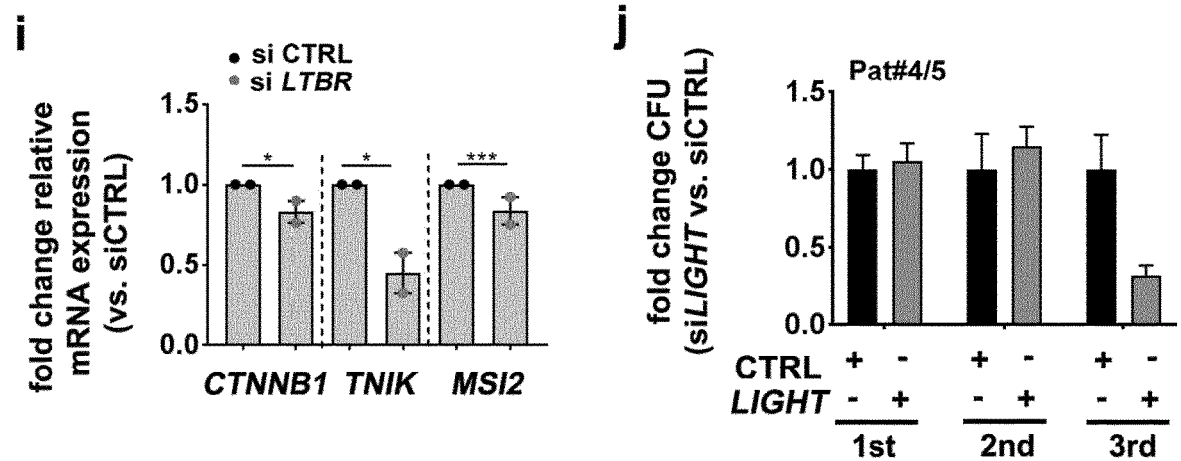

The inventors next analyzed the role of LIGHT/LTβR signaling in human HSPCs. LTβR and LIGHT were expressed by human CD34$^+$ BM cells on mRNA and on protein level (FIG. 7a). LTBR knockdown using siRNA in FACS-purified BM CD34+ HSPCs from healthy donors significantly increased the expression of genes related to proliferation, such as CCND1, but reduced stemness-related gene such as MSI2 (FIG. 7b). In addition, CD34+ BM cells treated with siRNA for 24 hours formed significantly fewer colonies in methylcellulose and lost the CFU capacity in serial re-platings, indicating that the knockdown of LTβR reduced the number of functional HSCs (FIG. 7c).

To analyze the expression of LTβR, LTA, LTβ and LIGHT in CD34+ CML stem/progenitor cells, the inventors took advantage of a public available microarray data set (GEO: GSE11675). While LTA and LTβ were similarly expressed in normal and in CML CD34+ cells, LTβR and LIGHT expression was clearly increased in CML samples (FIG. 7f,g).

LTBR knockdown in CD34+ CML cells resulted in more colonies in the first plating in methylcellulose but fewer colonies in the $2^{nd}$ re-plating (FIG. 7h). Importantly, knockdown of LTβR reduced the expression of MSI2, CTNNB1 and TNIK, indicating reduced stemness (FIG. 7i). LIGHT knockdown in CML CD34+ HSPCs resulted in a reduced CFU capacity after re-plating (FIG. 7j). Collectively, this data indicates that LIGHT/LTβR signaling contributes to the maintenance and self-renewal of human hematopoietic and CML stem/progenitor cells.

Discussion

In response to an increased demand of blood cells, HSPCs are activated to enter cell cycling, proliferation, differentiation and migration. This activation is regulated by paracrine signals from the HSC niche cells including endothelial cells and BM mesenchymal stromal cells and from immune cells of the BM microenvironment.

In the present study, the inventors demonstrate that LTβR signaling activated via autocrine LIGHT expression is an important mechanism that regulates cell-cycle activity. Different TNF receptors have been implicated in the regulation of hematopoiesis. TNF-α is a major regulator of demand-adapted hematopoiesis via signaling the p55 TNF receptor 1α (Rebel, V. I. et al. Journal of Experimental Medicine, 190 (10), 1493-504 (1999)). In addition, CD70 expressing immune cells regulated HSPCs function and differentiation during infection via CD27 signaling. Similarly to CD27, LTβR signals via TNF receptor-associated factors (TRAFs) 2 and 5 and activates the NFκB pathway. Especially, the non-canonical NF-κB signaling pathway has been implicated in the regulation of HSC self-renewal. However, CD27-deficiency does not influence the self-renewal capacity of HSCs whereas in the present study Ltbr-deficiency in HSPCs leads to decreased self-renewal capacity in vitro and in vivo. This difference may be explained by the regulation of the ligands. CD70 is only expressed on immune cells and subsets of dendritic cells upon activation. In the present study, the inventors found that LIGHT was expressed on HSPCs and on osteoblasts. The in vitro culture experiments with FACS-purified HSCs and the transfer of HSCs to $Light^{-/-}$ recipients indicated that autocrine LIGHT expression was crucial in the regulation of HSC self-renewal. Importantly, both LTβR and LIGHT are up-regulated upon hematopoietic stress induced by a genotoxic drug or transplantation into irradiated recipient mice. LIGHT is known to be inducible expressed in various immune cell types, depending on the tissue and their activation status.

LIGHT/LTβR signaling maintained the pool of HSCs and LSCs by reducing cell proliferation and thereby inducing quiescence. The presented gene array analysis indicated a down-regulation of genes involved in cell cycling and proliferation in the absence of LTβR signaling, such as Cdk4 and Cdk6. These cyclin-dependent kinases are known to complex with cyclin D1 to regulate G1/S transition and likely exit HSCs from quiescence. Moreover, the inventors demonstrate that knockdown of LTbR in human HSPCs increase gene expression of cell cycle related genes, such as CCND1. It was found that LTβR signaling promoted asymmetrical of symmetrical cell division, an additional mechanism to maintain the stem cell pool. In accordance with these findings, the expression of the stemness related genes Msi2 and Gfi-1 was increased in the absence of LTβR signaling in murine and in human HSCs.

Dysregulation in self-renewal mechanism and differentiation promote hematological malignancies. The inventors identified a similar role for LTβR signaling in the maintenance and expansion of CML stem cells by favoring symmetric cell division and reducing differentiation. Therefore, Ltbr-deficiency in LSCs reduced the number of leukemia HSPCs in the bone marrow and prolonged survival. Importantly, mouse and human CML cells express LTβR and LIGHT at higher levels when compared to healthy controls. Knockdown of LTβR in human CML HSPCs resulted in the down-regulation of stemness- and Wnt related genes, such as MSI2, TNIK and CTNNB1. Comparably, CD27 has been shown to induce stemness in LSCs and promote disease progression in CML and AML. Since LSCs are resistant to most of the current treatments, targeting pathways that regulate and maintain LSCs are crucial to advance the treatments for leukemia. Blocking the LIGHT/LTβR pathway may offer a novel strategy to induce differentiation and to eliminate LSCs.

The invention claimed is:

1. A method for treatment of a haematologic malignancy, comprising administering to a subject in need thereof
    a nucleic acid capable of specifically suppressing expression of LIGHT
    wherein the haematologic malignancy is CML.
2. The method according to claim 1, wherein the nucleic acid molecule is a DNA molecule or an RNA molecule.
3. The method according to claim 1, wherein the nucleic acid is a nucleic acid expression vector comprising or expressing the nucleic acid molecule.
4. The method according to claim 3, wherein the expression vector is selected from:
    a. a nucleic expression construct selected from a DNA plasmid, a double stranded linear DNA, and a single stranded RNA, and
    b. a virus selected from the group consisting of a lentivirus, a herpesvirus, an adenovirus and an adeno-associated virus.
5. The method according to claim 1, wherein the nucleic acid is administered in a pharmaceutical composition comprising the nucleic acid and a pharmaceutically acceptable carrier.
6. The method according to claim 5, wherein the pharmaceutical composition is formulated for parenteral administration.
7. The method according to claim 4, wherein the nucleic acid expression construct is encapsulated in a lipid vesicle.

* * * * *